(12) United States Patent
Ikeda

(10) Patent No.: US 6,999,991 B1
(45) Date of Patent: Feb. 14, 2006

(54) PUSH SERVICE SYSTEM AND PUSH SERVICE PROCESSING METHOD

(75) Inventor: Hiroshi Ikeda, Kanagawa (JP)

(73) Assignee: Fujitsu Limited, Kawasaki (JP)

( * ) Notice: Subject to any disclaimer, the term of this patent is extended or adjusted under 35 U.S.C. 154(b) by 869 days.

(21) Appl. No.: 09/624,337

(22) Filed: Jul. 24, 2000

(30) Foreign Application Priority Data

Oct. 29, 1999 (JP) .................................. 11-310254

(51) Int. Cl.
*G06F 13/00* (2006.01)

(52) U.S. Cl. ...................... 709/206; 709/202; 709/219; 709/224

(58) Field of Classification Search ................ 709/239, 709/238, 241, 226, 202, 203, 206, 217, 219, 709/223, 224; 719/318
See application file for complete search history.

(56) References Cited

U.S. PATENT DOCUMENTS

| | | | | |
|---|---|---|---|---|
| 6,055,570 A | * | 4/2000 | Nielsen | ....................... 709/224 |
| 6,505,254 B1 | * | 1/2003 | Johnson et al. | ............. 709/239 |
| 6,687,241 B1 | * | 2/2004 | Goss | ........................... 370/352 |
| 2001/0052015 A1 | * | 12/2001 | Lin et al. | ..................... 709/226 |
| 2002/0133573 A1 | * | 9/2002 | Matsuda et al. | ............ 709/220 |
| 2003/0052916 A1 | * | 3/2003 | Stern | ........................... 345/760 |
| 2003/0204756 A1 | * | 10/2003 | Ramson et al. | ............. 713/300 |
| 2004/0028213 A1 | * | 2/2004 | Goss | ..................... 379/265.09 |

FOREIGN PATENT DOCUMENTS

| | | | | |
|---|---|---|---|---|
| JP | 2000550769 | | * | 4/1999 |
| JP | 1-022875 | A1 | * | 1/2000 |
| JP | 2001402660 | | * | 5/2001 |

* cited by examiner

*Primary Examiner*—Viet D. Vu
(74) *Attorney, Agent, or Firm*—Staas & Halsey LLP

(57) ABSTRACT

A push service system is provided with data servers which are connected to an Internet and post information about updating information in storage sections to an agent, an agent which is connected to the Internet and when the information about updating is information about updating requested by registered user terminals, post the information about updating to the registered user terminals, and the user terminals which are connected to the Internet and receives the information about updating from the agent and access to the data servers which have posted the information about updating so as to obtain contents of the updated information.

9 Claims, 18 Drawing Sheets

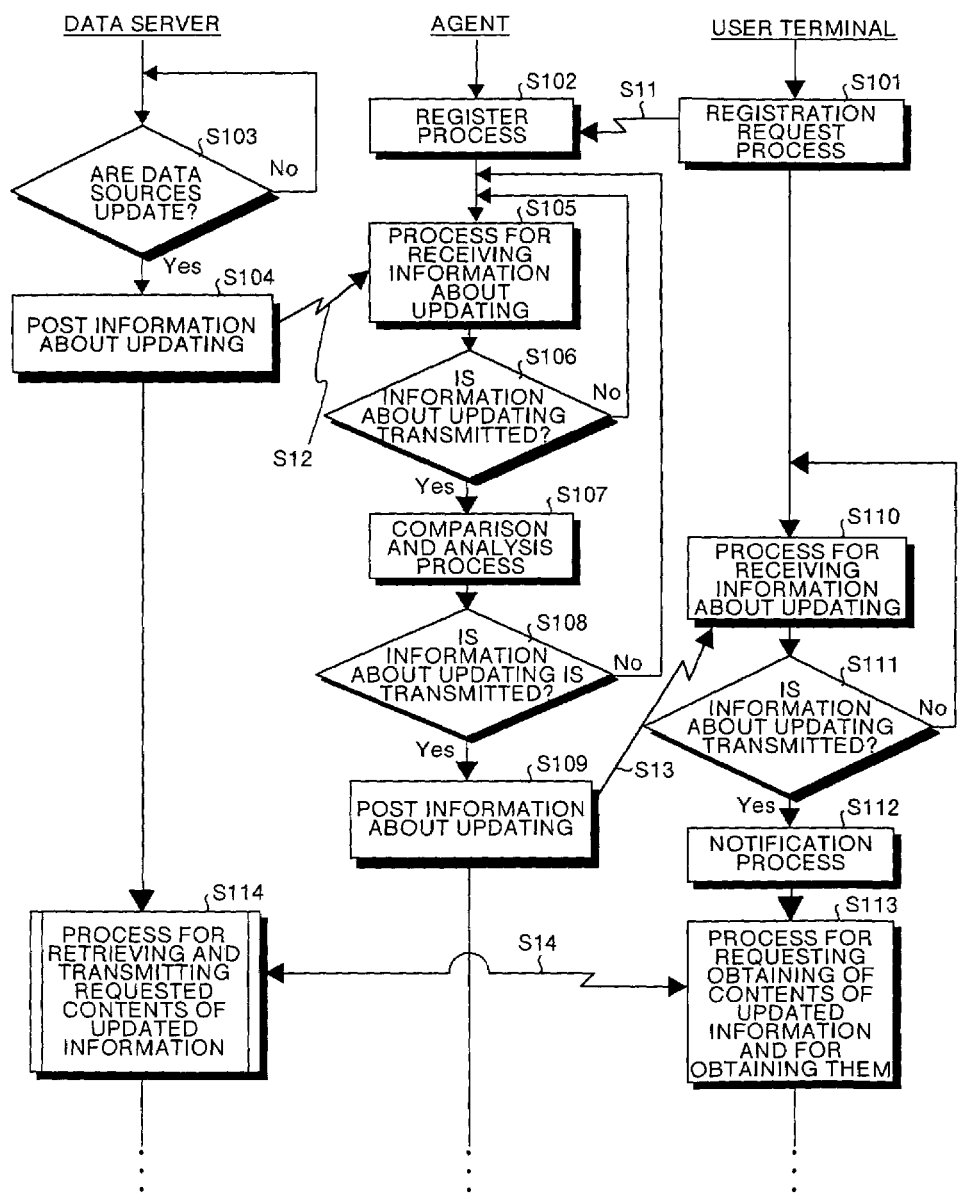

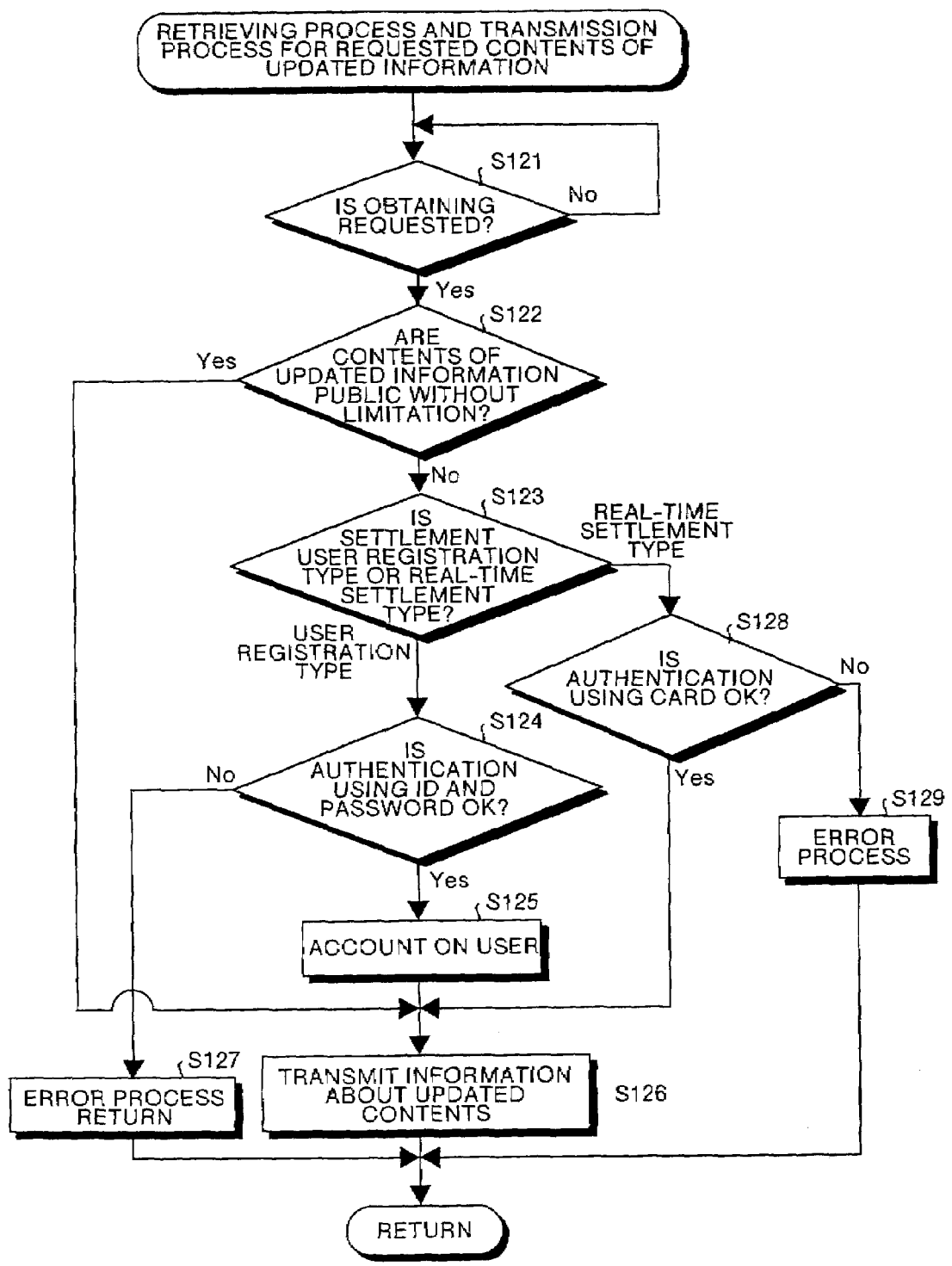

FIG.5A
CONTENTS OF USER MANAGEMENT PER DATA TYPE

- DATA TYPE INFORMATION EX: ID, CONTENTS OF DATA — D31
- USER INFORMATION EX: ID — D32
- ANOTHER USER INFORMATION DATA TYPE INCIDENTAL TO DATA TYPE USER ID — D33

FIG.5B
CONTENTS OF DATA TYPE MANAGEMENT

- DATA TYPE INFORMATION EX: ID, CONTENTS OF DATA, UNIT PRICE OF INFORMATION — D41
- DATA TYPE OF MEMBERSHIP — D42
- DATA SERVER — D43

FIG.5C
CONTENTS OF DATA SERVER MANAGEMENT

- LIST OF SERVERS WHICH ARE PERMITTED TO PROVIDE DATA — D51

OR

- LIST OF SERVERS WHICH INTEND TO PROVIDE DATA — D52

PUSH SERVICE SYSTEM AND PUSH SERVICE PROCESSING METHOD

FIELD OF THE INVENTION

The present invention relates to a push service system and a push service processing method for processing push service in a network using IP (Internet protocol).

BACKGROUND OF THE INVENTION

In recent years, as computer technique and IP network have developed, push service is widely provided in the Internet or intranet. The push service transmits data of a host apparatus in the network to a low-order apparatus of a user or the like at timing different from that of a request from the low-order apparatus. To transmit the data from the host apparatus to the low-order apparatus when the low-order apparatus requests the data from the host apparatus is called pull. In this push service, it is important that data are distributed efficiently and quickly, and realization of the push service which distributes data efficiently and quickly is realized.

Most of the conventional push services are realized by automatically accessing from a user terminal to a predetermined type of information per constant time. That is, a function for accessing to a data source including the predetermined information per constant time is provided to the user terminal, and update information of the data source is obtained from the accessed results.

In another push services, user terminals are registered in a data source including various data, and when the data source is updated, the data source directly provides the updated data to the respective user terminals. In this case, the data source itself has the function for providing distribution service.

However, the conventional push services where the access is executed per constant time, since a check is made as to whether or not the information in the data source is updated in each access, there arises a problem that useless traffic on the network increase.

In addition, in this push service system, since free time intervals between the checks of the updated information in the data source exist, there arises a problem that emergent information such as news flash cannot be obtained immediately.

Meanwhile, in the conventional push service where the user terminals are registered in the respective data sources, since information about the user terminals is registered in the respective data sources, the respective data sources hold the information about the reduplicate user terminals. As a result, a lot of resources are required so that the resources cannot be used effectively, and flexible expandability to the push service system cannot be expected.

SUMMARY OF THE INVENTION

It is an object of the present invention to provide a push service system and a push service processing method in which resources in a network are utilized efficiently without increasing traffic on the network, and information required by users can be obtained quickly and expandability is high.

According to one aspect of this invention, a plurality of user terminals transmit information of the user terminals and requested various information to some of not less than one agents so as to execute the registration process. A plurality of data servers have various information and post information about updating of various information to the agents. When the posted information about updating is the information about updating which is requested by the registered user terminals, the not less than one agents post the information about updating to the registered user terminals. The user terminals which have received the post access directly to the data servers which hold contents of the updated information via the network based on the posted information about updating, and obtain the contents of the updated information.

According to another aspect of this invention, a plurality of user terminals transmit information of the user terminals and requested various information to some of not less than one agents so as to execute the registration process. A plurality of data servers have various information and post information about updating of various information to the agents. When the posted information about updating is the information about updating which is requested by the registered user terminals, the not less than one agents access to the data servers which have posted the information about updating via the network, and obtain contents of the updated information, and post the contents of the updated information to the registered user terminals via the network. The user terminals which have received the post receive the posted contents of the updated information, and obtain the contents of the updated information.

According to still another aspect of this invention, a plurality of user terminals transmit information of the user terminals and requested various information to some of not less than one agents so as to execute the registration process. A plurality of data servers have various information and post information about updating of various information to the agents. When posted contents of the updated information is the information about updating which is requested by the registered user terminals, the not less than one agents post the contents of the updated information to the registered user terminals via the network. The user terminals which have received the post receive the posted contents of the updated information and obtain it.

Further, a plurality of user terminals transmit information of the user terminals and requested various information to some of the plurality of agents in the subnetwork connected to the network so as to execute the registration process. A plurality of data servers have various information and post information about updating of various information or contents of the updated information to the agents by means of broadcasting. When the posted information about updating or contents of the updated information is the information about updating which is requested by the registered user terminals, the agents post the information about updating or contents of the updated information to the registered user terminals via the network. The user terminals which have received the post access to the data servers which hold the contents of the updated information based on the posted information about updating and obtain the contents of the updated information, or receive the posted contents of the updated information so as to obtain them.

Further, a plurality of user terminals transmit information of the user terminals and requested various information to representative agent connected to the network. The representative agent transmit the information about user terminals and the request various information suitably to some of the plurality of agents in the subnetwork so as to execute the registration process. A plurality of data servers have various information and post information about updating of various information or contents of the updated information to the representative agent. The representative agent posts them to the agent by means of broadcasting. When the posted information about updating or contents of the updated information is the information about updating which is requested by the registered user terminals, the agents post the information about updating or contents of the updated information to the registered user terminals via the representative agent or the network. The user terminals which have received the post access to the data servers which hold the contents of the updated information based on the posted information about updating and obtain the contents of the updated information, or receive the posted contents of the updated information so as to obtain them.

Further, a plurality of user terminals transmit information of the user terminals and requested various information to agents which are locally connected to providers connecting the user terminals so as to execute the registration process. A plurality of data servers have various information, and IP-multi-cast and post information about updating of various information or contents of the updated information to the agents via the provider. When the posted information about updating or contents of the updated information is the information about updating which is requested by the registered user terminals, the agents post the information about updating or contents of the updated information to the registered user terminals. The user terminals which have received the post access to the data servers which hold the contents of the updated information based on the posted information about updating and obtain the contents of the updated information, or receive the posted contents of the updated information so as to obtain them.

Further, a plurality of user terminals transmit information of the user terminals and requested various information to a high-hierarchical agent which is locally connected to the provider connecting the user so as to execute the registration process. The high-hierarchical agent transmits the information of the registered user terminals and requested various information to a higher-hierarchical agent so as to execute a registration process. A plurality of data servers have various information, and IP-multi-cast and post information about updating of various information or contents of the updated information to the highest-hierarchical agents via the provider. When the posted information about updating or contents of the updated information is the information about updating which is requested by the registered user terminals, the highest-hierarchical agents post the information about updating to the registered user terminals or the contents of the updated information to the low-hierarchical agents. When the posted information about updating and contents of the updated information is information about updating requested by the registered user terminals, the low-hierarchical agents which have received the post the information about updating to the registered user terminals or contents of the updated information to the low-hierarchical agents or the user terminals. When the low-hierarchical agents have lower-hierarchical agents, the posting process which is similar to the low-hierarchical agents is executed. The user terminals access to the data servers which hold the contents of the updated information based on the posted information about updating and obtain the contents of the updated information, or receive the posted contents of the updated information so as to obtain them.

Further, a plurality of user terminals transmit information of the user terminals and requested various information to some of not less than one agents so as to execute the registration process. A plurality of data servers have various information and post information about updating of various information to the agents. When the posted information about updating is the information about updating which is requested by the registered user terminals, the not less than one agents post the information about updating to the registered user terminals via a network different from the above-mentioned network, such as a portable telephone network. The user terminals which have received the post access directly to the data servers which hold contents of the updated information via the network based on the posted information about updating, and obtain the contents of the updated information.

Further, when not less than one agents accept the post that various information is provided from a data server which is not registered in a list table of data servers which provide various information, the agents automatically register the unregistered data server into the list table.

Further, when not less than one agents accept the post of management contents of various information managed by data servers which provide the various information, the agents automatically add or delete data servers in data type management information based on the posted management contents.

Further, when not less than one agents accept the post of information about adding or deleting data types of various information managed by data servers which provide the various information, the agents add or delete data servers which relate to the data types to be added or deleted to/from the data servers in data type management information.

Further, when data types to be managed are changed, not less than one agents post the change of the data types to registered user terminals.

Further, data types are managed in a hierarchical relationship and when the data types are changed, not less than one agents post the change of the data types to user terminals in which data types with lower hierarchy than that of the changed data types.

According to still another aspect of this invention, information of the user terminals connected to a network using an Internet protocol and various information which is requested to be posted by the user terminals are registered into agents, which are connected to the network and are substitute for the user terminals, at a registration step. A plurality of data servers which are connected to the network and hold various information post information about updating of the various information to the agents via the network at a first post step. When the agents accept the information about updating posted by the data servers and the information about updating is information about updating requested by the registered user terminals, the agents post the information about updating to the registered user terminals via the network at a second post step. The user terminals accept the post of the information about updating from the agents at a obtaining step. The user terminals accept to the data servers which have posted the information about updating at the first post step via the network so as to obtain contents of the updated information.

According to still another aspect of this invention, information of the user terminals connected to a network using an Internet protocol and various information which is requested to be posted by the user terminals are registered into agents, which are connected to the network and are substitute for the user terminals, at a registration step. A plurality of data servers which are connected to the network and hold various information post information about updating of the various information to the agents via the network at a first post step. When the agents accept the information about updating posted by the data servers and the information about updating is information about updating requested by the registered user terminals, the agents access to the data servers which have posted the information about updating via the network so as to obtain contents of the updated information at an obtaining step. The agents post the contents of the updated information obtained at the obtaining step to the registered user terminals via the network at a second post step.

According to still another aspect of this invention, information of the user terminals connected to a network using an Internet protocol and various information which is requested to be posted by the user terminals are registered into agents, which are connected to the network and are substitute for the user terminals, at a registration step. A plurality of data servers which are connected to the network and hold various information post contents of the updated various information to the agents via the network at a first post step. When the agents accept the information about updating of the various information posted by the data servers and the information about updating is information about updating requested by the registered user terminals, the agents post the contents of the updated information to the registered user terminals via the network at a second post step.

Further, agents post information about updating or contents of updated information, which are posted by data servers via a network other than the above network, such as a portable telephone network to user terminals.

Further, when not less than one agents accept the post that various information is provided from a data server which is unregistered in a list table for managing a list of data servers for providing the various information, the agents automatically register the data server into the list table.

Further, when not less than one agents accept the post of management contents of various information managed by data servers which provide the various information, the agents automatically add or delete data servers in data type management information managed per data type based on the posted management contents.

Further, when not less than one agents accept the post of information about adding or deleting data types of various information managed by data servers which provide the various information, the agents automatically add or delete data servers which relate to the data types to be added or deleted to/from the data servers in data type management information for managing the various information per data type.

Further, when data types to be managed are changed, not less than one agents automatically post the change of the data types to the user terminals.

Further, data types are managed in a hierarchical relationship and when the data types are changed, not less than one agents post the change of the data types to user terminals in which data types with lower hierarchy than that of the changed data types.

Other objects and features of this invention will become apparent from the following description with reference to the accompanying drawings.

BRIEF DESCRIPTION OF THE DRAWINGS

FIG. 2 is a flow chart showing a push service processing procedure using the push service system according to the first embodiment of the present invention.

FIG. 3 is a flow chart showing detection process and transmission processing procedure for contents of updated information in a data server.

FIG. 5A to FIG. 5C are diagrams showing data management structures in an agent.

DESCRIPTION OF THE PREFERRED EMBODIMENTS

Preferred embodiments of a document directory distributed management system, a method of obtaining this system, and a recording medium onto which a program for allowing a computer to execute the method is recorded and which can be read by the computer according to the present invention will be explained below with reference to the drawings.

Figure 1:
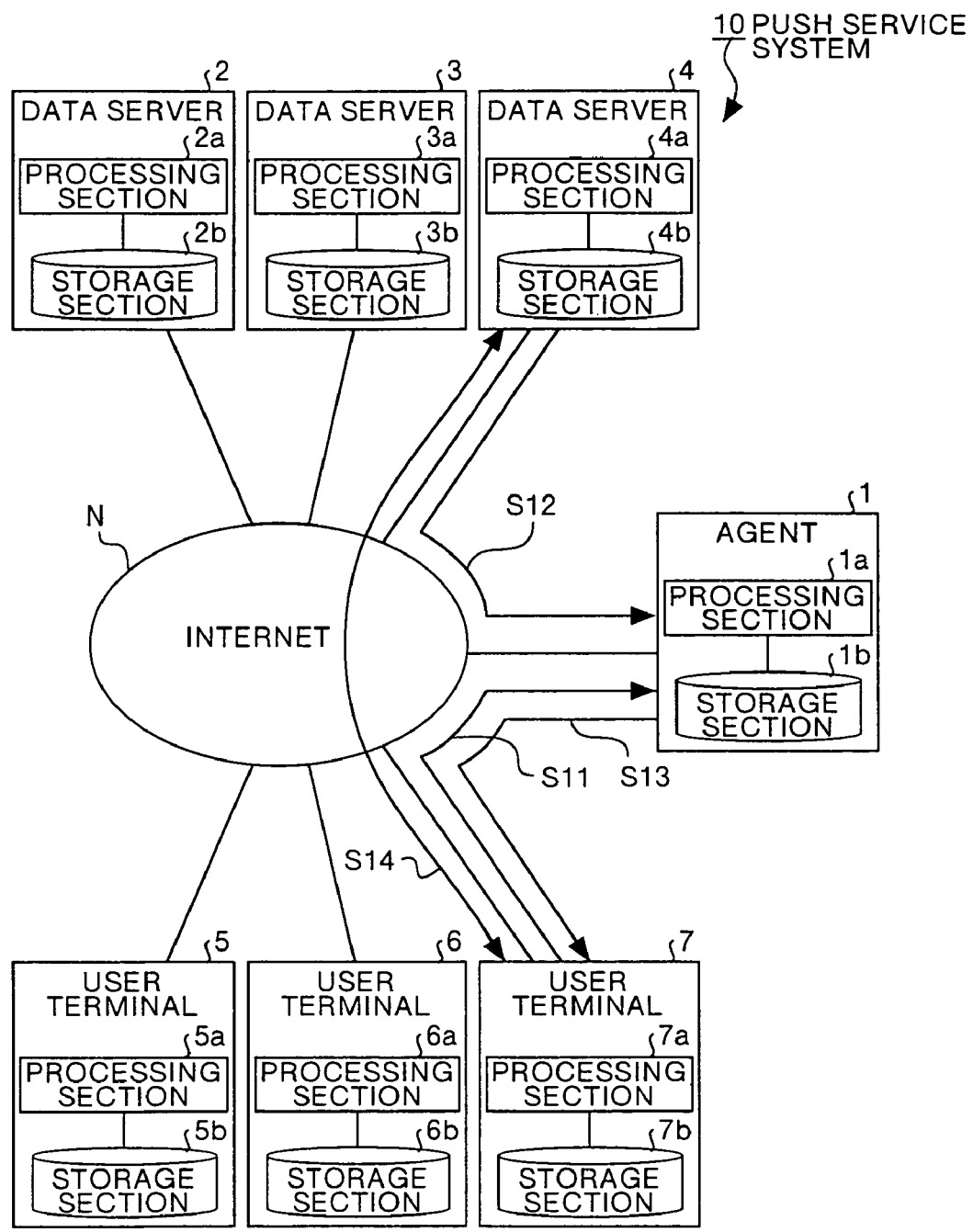
FIG. 1 is a diagram showing a structure of a push service system according to a first embodiment of the present invention.

FIG. 1 is a diagram showing a structure of a push service system according to a first embodiment of the present invention. In FIG. 1, in the push service system 10, an agent 1 is connected to the Internet N, a plurality of data servers 2 to 4 and a plurality of user terminals 5 to 7. The user terminals 5 to 7 register information about addresses of the user terminals 5 to 7 and information about types of data to be requested to the agent (S11). The agent 1 serves as representation of the user registered user terminals 5 to 7, and when various information which is held and managed by the data servers 2 to 4 is updated, the data servers 2 to 4 post the information about updating to the agent 1 (S12).

When the information about updating is posted from the data servers 2 to 4, the agent 1 compares and analyzes as to whether the information about updating is the information to be requested by the user terminals 5 to 7. When both the information coincide with each other, the agent 1 posts the information about updating to the user terminals 5 to 7 (S13). When the user terminals 5 to 7 receives the information about updating, the user terminals 5 to 7 access directly to the data servers 2 to 4, which post the information about updating, via the Internet N, and obtain the contents of the updated information (S14).

As a result, a series of the push service process is executed. The agent 1 has a processing section 1*a* and a storage section 1*b*. The data servers 2 to 4 have processing sections 2*a* to 4*a* and storage sections 2*b* to 4*b* respectively. The user terminals 5 to 7 have processing sections 5*a* to 7*a* and storage sections 5*b* to 7*b* respectively.

A series of the push service process will be further explained below with reference to FIG. 2 and FIG. 3. FIG. 2 is a flow chart showing the push service processing procedure using the push service system according to the first embodiment of the present invention. As shown in FIG. 2, the user terminals 5 to 7 request the agent 1 to register the user terminals 5 to 7 (steps S101 and S11). On the contrary, the agent 1 registers the user terminals 5 to 7 which are requested to be registered (S102).

Meanwhile, the data servers 2 to 4 judge as to whether or not data sources of the various information stored in the storage sections 2*b* to 4*b* are updated (step S103). When the data sources are updated (YES at step S103), the data servers 2 to 4 posts the information about updating to the agent 1 via the Internet N (steps S104 and S12). The information about updating is information representing that updating is executed and is not entity of the updated information.

The agent 1 executes a process for receiving the information about updating (step S105), and judges as to whether or not the information about updating is received (step S106). Thereafter, the agent 1 compares and analyzes the information about updating with the information held by the agent 1 (step S107). In this comparison and analysis, the data type represented by the information about updating is compared with the data type registered by the user terminal so that a determination is made as to whether or not the data types coincide with each other or corresponding data type exists.

The agent 1 judges as to whether or not the received information about updating should be transmitted to the registered user terminals (step S108). When the judgment is made that the information should be transmitted to the user terminals (YES at step S108), the agent 1 posts the information about updating to the user terminals which request the information about updating and are registered (step S109 and S13). When the agent 1 does not receive the information about updating (NO at step S106) or do not transmit the information about updating (NO at step S108), the agent 1 goes to step S105 so as to repeat the process for receiving the information about updating.

The user terminals 5 to 7 execute the process for receiving the information about updating (step S110), and judge as to whether or not the information about updating is received (step S111). When the information about updating is received (YES at step S111), the user terminals 5 to 7 post the information about updating (step s112). For example, the information about is displayed on display sections, not shown, of the user terminals 5 to 7 or an alarm is sounded. Thereafter, the user terminals 5 to 7 request a data server which holds the contents of the updated information to obtain the contents of the updated information which are entity of the updated information based on the information about updating via the Internet N. The data server retrieves the requested contents of the updated information, and transmits the contents of the updated information to the user terminals which made the request. The user terminals obtain the contents of the updated information (steps S113, S114 and S14).

As a result, a series of the push service process is executed. A retrieval processing and transmission processing procedures for the contents of updated information on the data server side shown at step S114 will be explained below with reference to the flow chart of FIG. 3. As shown in FIG. 3, the data server judges as to whether or not the request to obtain the contents of the updated information is received from the user terminals (step S121). When the obtaining request is received (YES at step S121), the data server judges as to whether or not the requested contents of the updated information are information to be public without limitation (step S122). When the contents of the updated information are to be public without limitation (YES at step S122), the data server transmits the contents of the updated information to the user terminals (step S126) and returns to step S114.

When the contents of the updated information are not to be public without limitation (NO at step S122), the data server judges as to whether or not a settlement type is a user registration type or a real-time settlement type (step S123). When the user registration type, the data server executes a authenticating process using user's ID or password, and judges as to whether or not this authentication is accepted (step S124) When the authentication is accepted (YES at step S124), the data server executes accounting on the users (step S125). Thereafter, the data server transmits the contents of the updated information to the user terminals (step S126) and returns to step S114. On the contrary, the authentication is not accepted (NO at step S124), the data server executes an error process (step S127) and returns to step S114.

Meanwhile, when the settlement is the real-time settlement type, the data server executes an authentication process for making Internet settlement using credit card or prepaid card, and judges as to whether or not the authentication is accepted (step S128). When the authentication is accepted (YES at step S128), the data server transmits the contents of the updated information (step S126) and returns to step S114. On the contrary, when the authentication is not accepted (NO at step S128), the data server executes an error process (step S129) and returns to step S114. Even if the contents of the updated information charge a fee, with the above-process, the data server securely makes the settlement and can provide the contents of the updated information to the users.

Figure 4A:
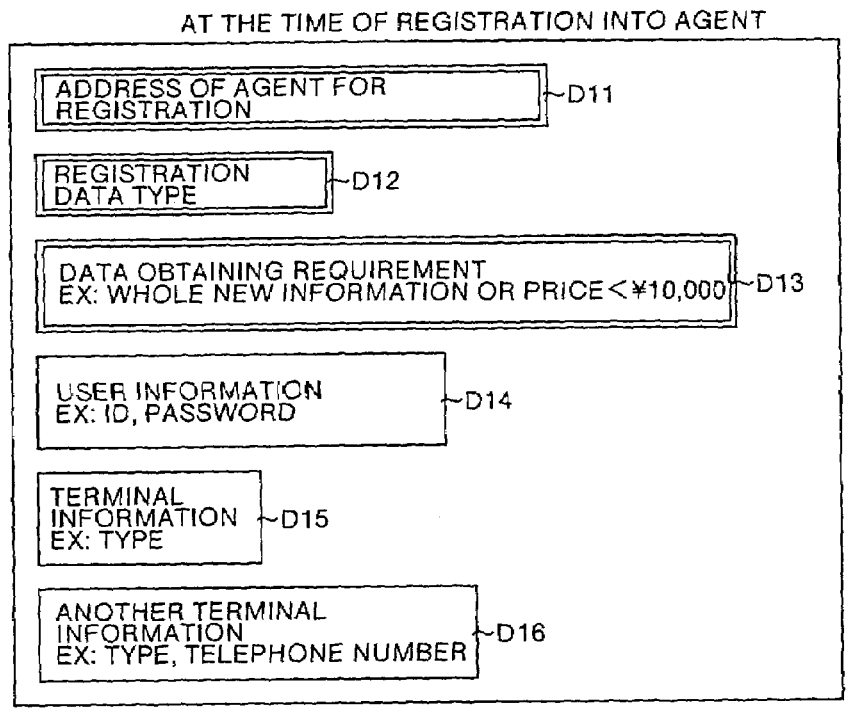
FIG. 4A and FIG. 4B are diagrams showing data management structures in a user terminal.
Figure 4B:
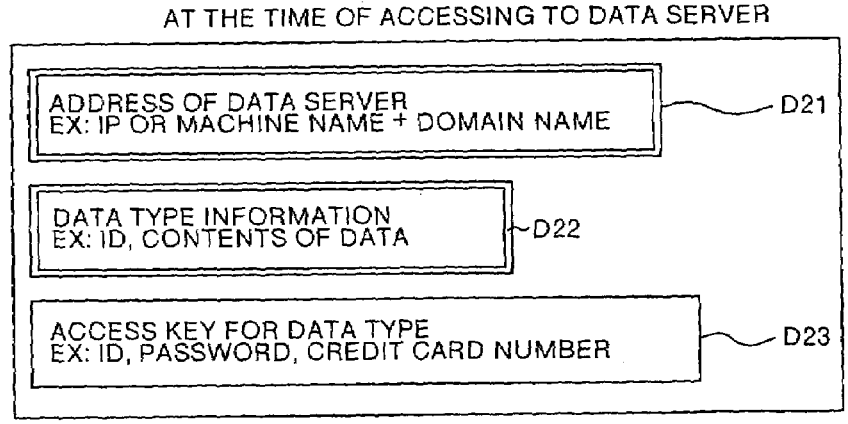

Information about the push service process which is managed by the user terminals 5 to 7, the agent 1 and the data servers 2 to 4 will be explained below with reference to FIG. 4 to FIG. 6. FIG. 4A and FIG. 4B are diagrams showing data management structures in the user terminals. When the user terminals 5 to 7 request the agent 1 to register the user terminals, data, for example, shown in FIG. 4A are required.

In other words, the user terminals 5 to 7 request the agent 1 to register the user terminals 5 to 7 using an address D11 of the agent 1 in which the user terminals 5 to 7 should be registered, a registered data type D12 such as data type "news" and the like which is desired by the user terminals, a data obtaining requirement D13 such as "whole new information or price <10,000 yen" and the like, user information D14 such as ID and password, terminal information D15 such as equipment type and the like, and another terminal information D16 held by the users such as equipment type, telephone number and the like. In this case, the address D11, the registered data type D12 and the data obtaining requirement D13 are essential information. When the user information D14, the terminal information D15, and the another terminal information D16 are required by the agent 1, they are required when the agent 1 accesses to the data servers 2 to 4 as mentioned below.

FIG. 4B shows data which are used when the user terminals access to the data servers for the request to obtain the contents of the updated information. The user terminals 5 to 7 hold a data server address D21 represented by IP or machine name and domain name, data type information D22 about ID or updated information which is the contents of data, and an access key D23 to data type such as ID, password, credit card No. and the like. The data server address D21 and the data type information D22 are essential information.

FIG. 5A to FIG. 5C are diagrams showing the data management structures in the agent 1. As shown in FIG. 5A to FIG. 5C, the agent 1 manages the user terminals 5 to 7 and the data server 2 to 4 according to the data type. As shown in FIG. 5A, the agent 1 holds user management contents of each data type, the agent 1 manages a relationship between the data types and the user terminals 5 to 7. The user management contents include a data type information D31 such as ID and obtained data contents, user information D32 such as user ID, and another user information D33 incidental to data types and user IDs.

The data type information D31 and the user information D32 are essential information which should be managed by the agent 1. The ID in the data type information D31 is represented by a serial number, a hierarchical code and a number from new data type, and the data types can be managed hierarchically. The data contents may be managed by using XML description so that the following hierarchical link relationships:

<Group1 name=news>
    <Group2 name=sports>
    . . . are established.

FIG. 5B shows the data type management contents by means of the agent 1. A relationship between the data types and the data servers 2 to 4 is managed by the management contents. The data type management contents include data type information D41 such as ID, data contents and information price, membership data type D42, data server D43 which holds the data type. The data type information D41 is essential information.

Further, as shown in FIG. 5C, the agent 1 holds data server management contents, and manages a server list D51 of servers which are permitted to provide data or a server list D52 of servers which intend to provide data as list table.

Figure 6:
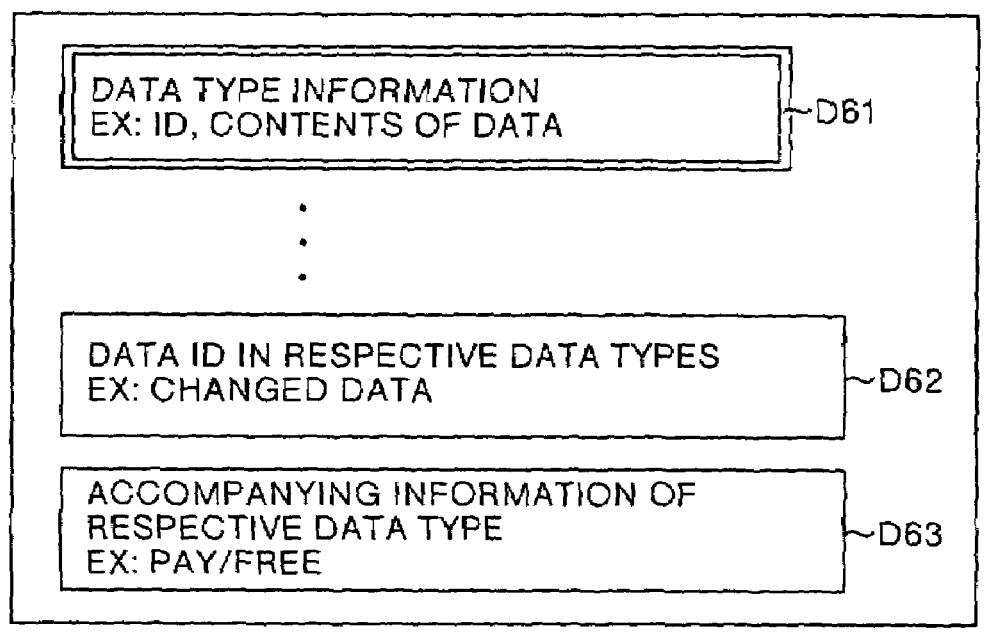
FIG. 6 is a diagram showing a data management structure in a data server.

FIG. 6 is a diagram showing the data management structure in the data servers. As shown in FIG. 6, the data servers have the plurality of pieces of data type information D61 such as ID and data contents for the push service process, and holds data IDs (D62) in the respective data types such as changing date and the like and accompanying information D63 of the respective data types such as pay/free. The data type information D61 is essential information for realizing this push service process.

When the post that various information is provided from an unregistered data server is received in the list table shown in FIG. 5C, the agent 1 additionally registers the unregistered data server into the list table automatically.

When the agent 1 receives the post of the information management contents which are managed by a data server which provides various information from this data server, the agent 1 automatically adds or deletes the data server based on the posted information management contents.

Further, the agent 1 automatically add or delete a data server relating to the data type of various information managed by the data server which provides the various information to/from this data server.

When the data type managed by the agent 1 is changed, the agent 1 automatically posts the change of the data type to the user terminals.

According to the first embodiment, the Internet N is connected with the agent 1 which is the representation of the user terminals 5 to 7, and the user terminals 5 to 7 register themselves as well as the information about a data type or the like to be requested into the agent 1. As a result, when the information held by the data servers 2 to 4 is changed, the information about updating is posted to the agent 1. In the case where the user terminals 5 to 7 which request the information such as the data type corresponding to the posted information about updating are registered, the agent 1 posts the information about updating to the corresponding user terminals 5 to 7. The user terminals 5 to 7 which received the post access to the data servers 2 to 4 directly via the Internet N so as to obtain the updated information contents. For this reason, the labor and time which are required for the user terminals 5 to 7 can be reduced on the user terminals 5 to 7 side, and the desired updated information contents can be obtained quickly. Moreover, since the limited agent 1 intervenes in the whole Internet, useless traffic on the Internet does not increase, and resources to be required for the push service process can be reduced. Further, the expandability of the push service process can be heightened.

A second embodiment of the present invention will be explained below. In the first embodiment, when the agent 1 receives the information about updating from the data servers 2 to 4, and if the user terminals 5 to 7 which requests the information such as the data type corresponding to the information about updating are included in the registered user terminals 5 to 7, the agent 1 posts the information about updating to the user terminals 5 to 7 and entrust the obtaining of the contents of the updated information to the user terminals 5 to 7. However, in this second embodiment, when the agent 1 receives the information about updating from the data servers 2 to 4 and the user terminals 5 to 7 which requests the information such as data type corresponding to the information about updating are included in the registered user terminals 5 to 7, the agent 1 obtains the contents of the updated information instead of the user terminals 5 to 7 and transmits the obtained contents of the updated information to the user terminals 5 to 7.

The structure of the push service system according to the second embodiment is the same as the structure in the first embodiment shown in FIG. 1. However, the processes by the agent 1 and the user terminals 5 to 7 are different. The push service processing procedure in the second embodiment of the present invention will be explained below with reference to the flow chart shown in FIG. 7.

Figure 7:
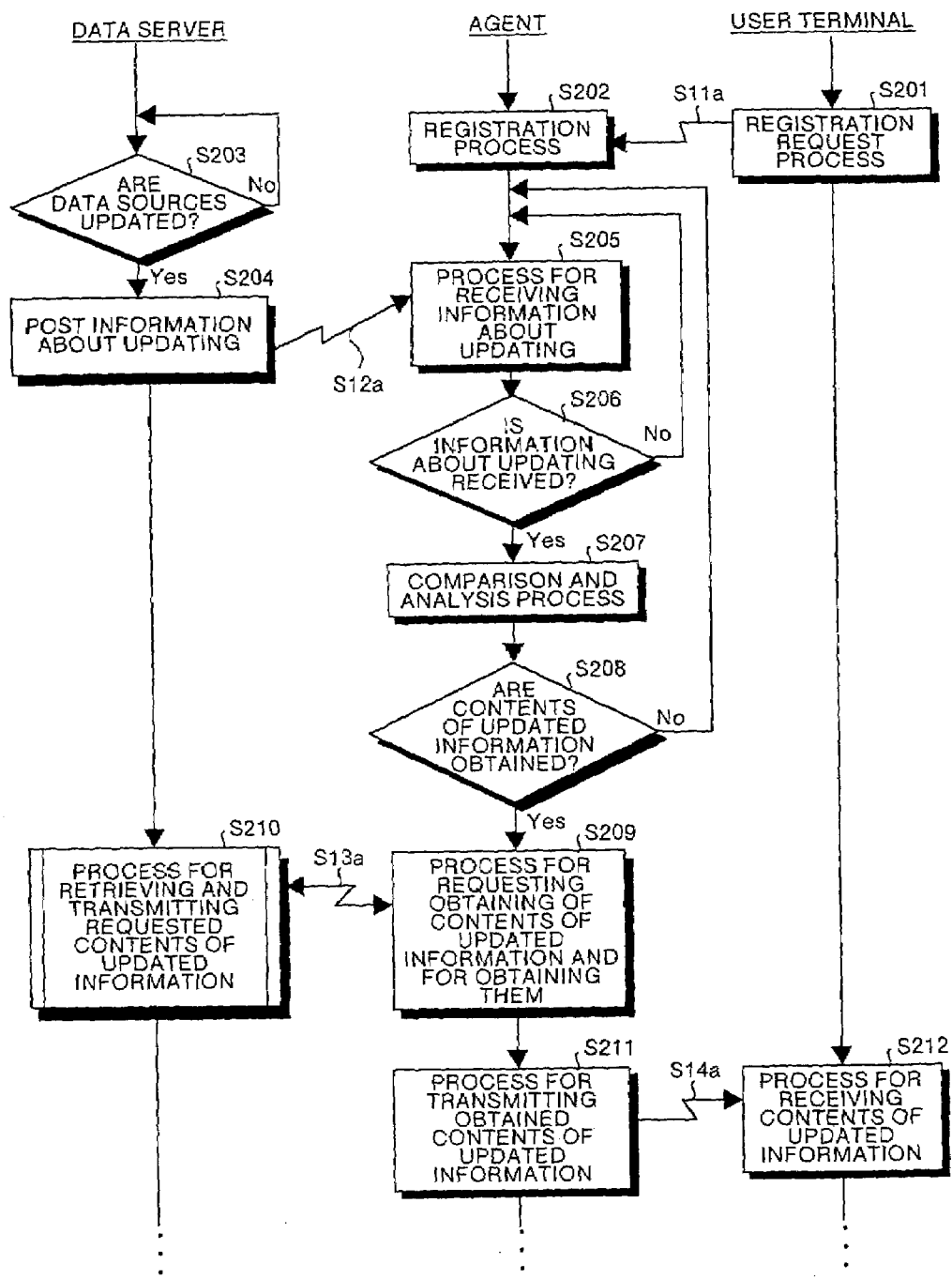
FIG. 7 is a flow chart showing the push service processing procedure according to a second embodiment of the present invention.

As shown in FIG. 7, the user terminals 5 to 7 execute a registration request process for the agent 1 (steps S201 and S11a). On the contrary, the agent 1 executes a registration process of the user terminals 5 to 7 requested to be registered (S202).

Meanwhile, the data server 2 to 4 judges as to whether or not data sources of various information stored in the storage sections 2b to 4b are updated (step S203). When the data sources are updated (YES at step S203), the data servers 2 to 4 posts information about updating to the agent 1 via the Internet N (steps S204 and S12a). The information about updating is information representing updating and is not entity of the updated information.

The agent 1 executes a process for receiving the information about updating (step S205), and judges as to whether or not the information about updating is received (step S206). Thereafter, the agent 1 compares and analyzes the information about updating with information held by the agent 1 (step S207). In this comparison and analysis, the data type represented by the information about updating is compared with the data type registered by the user terminal so that a determination is made as to whether or not the data types coincide with each other or corresponding data type exists. Thereafter, the agent 1 judges as to whether or not contents of updated information corresponding to the received information about updating should be obtained (step S208).

When the judgment is made that the contents of the updated information should be obtained (YES at step S208), the agent 1 requests the data server which holds the contents of the updated information about obtaining the contents of the updated information which are entity of the updated information via the Internet N based on the information about updating. The data server retrieves the requested contents of the updated information and transmits the contents of the updated information to the agent 1 which made the request. The agent 1 obtains the contents of the updated information (steps S209, S210 and S13a). On the contrary, the judgment is made that the contents of the updated information should not be obtained (NO at step S208), the agent 1 returns to step S205 and repeats the process for receiving the information about updating.

Thereafter, the agent 1 transmits the obtained contents of the updated information to the corresponding to user terminals (step S211 and S14a). The user terminals execute a process for receiving the contents of the updated information (step S212), and ends a series of the push service process.

According to the second embodiment, in the case where the information about updating is posted to the agent 1, and the user terminals 5 to 7 which request the information such as data type corresponding to the posted information about updating are registered, the agent 1 accesses to the data servers 2 to 4 and obtains the contents of the updated information based on the information about updating. The agent 1 transmits the obtained contents of the updated information to the corresponding to the user terminals 5 to 7. As a result, the labor and time required on the side of the user terminals 5 to 7 can be further reduced, and the desirable contents of the updated information can be obtained quickly. Moreover, since the limited agent 1 intervenes in the whole Internet, useless traffic on the Internet does not increase, and the resources relating to the push service process can be reduced. Further, the expandability of the push service process can be heightened.

A third embodiment of the present invention will be explained below. In the second embodiment, instead of the user terminals 5 to 7, the agent 1 accesses to the data servers 2 to 4 and obtains the contents of the updated information, and transmits the contents of the updated information to the corresponding user terminals 5 to 7. However, in this third embodiment, in the case where information is changed in the data servers 2 to 4, the data servers 2 to 4 transmit contents of the updated information to the agent 1. The agent 1 transmits the contents of the updated information to the user terminals 5 to 7.

The structure of the push service system in the third embodiment is the same as the structure in the first embodiment shown in FIG. 1. However, the processes of the data servers 2 to 4, the agent 1 and the user terminals 5 to 7 are different. The push service processing procedure according to the third embodiment of the present invention will be explained below with reference to the flow chart shown in FIG. 8.

Figure 8:
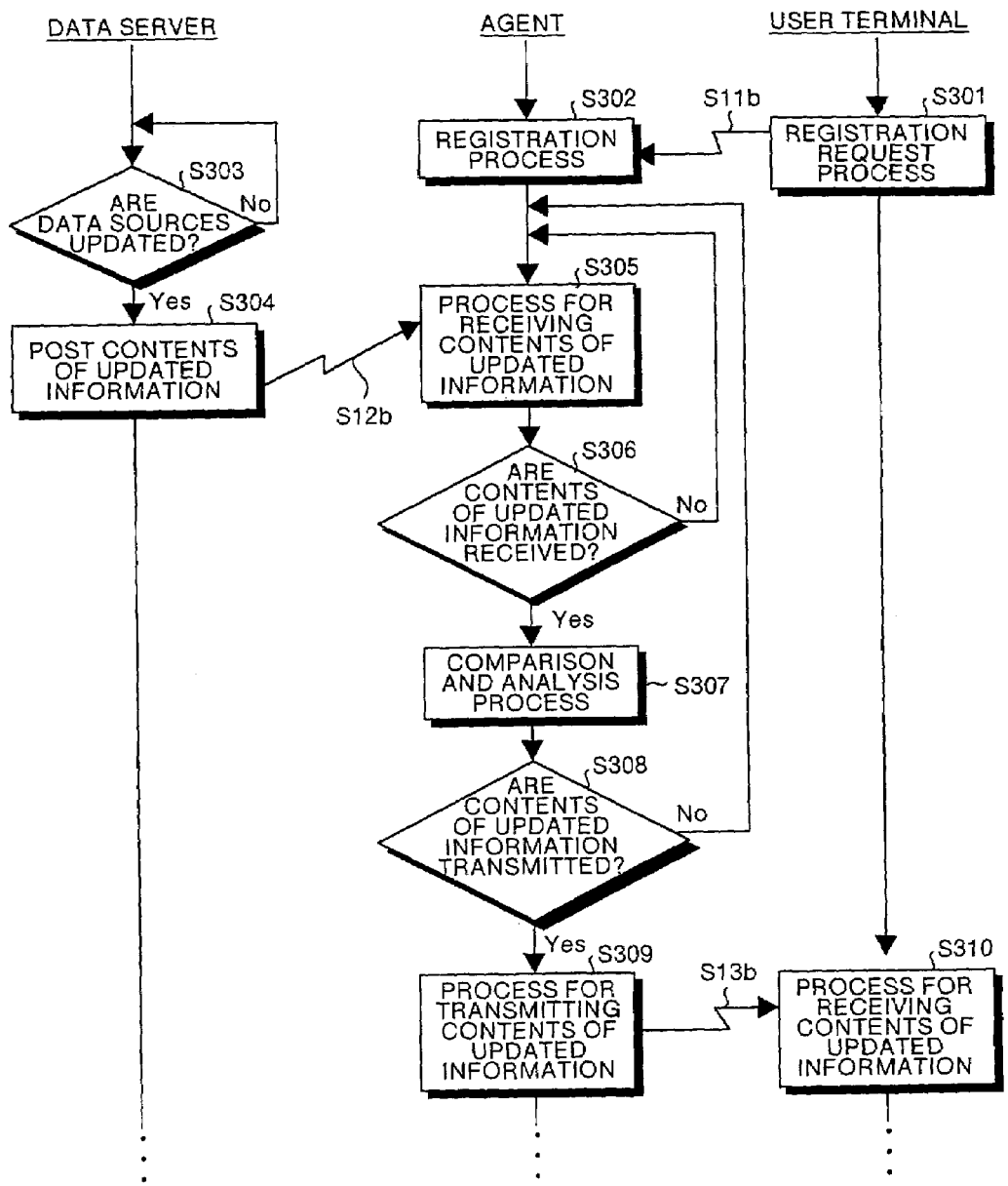
FIG. 8 is a flow chart showing the push service processing procedure according to a third embodiment of the present invention.

As shown in FIG. 8, the user terminals 5 to 7 executes a registration request process for the agent 1 (step S301 and S11b). On the contrary, the agent 1 registers the user terminals 5 to 7 which are requested to be registered (S302).

The data servers 2 to 4 judges as to whether or not data sources of various information stored in the storage sections 2b to 4b are updated (step S303). When the data sources are updated (YES at step S303), the data servers 2 to 4 post contents of updated information including the information about updating to the agent 1 via the Internet N (steps S304 and S12b).

The agent 1 executes a process for receiving the contents of the updated information (step S305) and judges as to whether or not the contents of the updated information are received (step S306). Thereafter, the agent 1 compares and analyzes the contents of the updated information with information held by the agent 1 (step S307). In this comparison and analysis, the data type represented by the contents of the updated information is compared with the data type registered by the user terminal so that a determination is made as to whether or not the data types coincide with each other or corresponding data type exists. Thereafter, the agent 1 judges as to whether or not the received contents of the updated information should be transmitted to the user terminals (step S308).

When the contents of the updated information should not be transmitted (NO at step S308), the agent 1 goes to step S305 and repeats the process for receiving the contents of updated information. On the contrary, when the contents of the updated information should be transmitted (YES at step S308), the agent 1 transmits the contents of the updated information to the corresponding user terminals (steps S309 and S13b). The user terminals execute a process for receiving the contents of the updated information (step S310) so as to end a series of the push service process.

According to the third embodiment, when the information held by the data servers 2 to 4 is updated, the data servers 2 to 4 transmit the contents of the updated information to the agent 1. The agent 1 transmits the contents of the updated information to the user terminals 5 to 7 which request the information corresponding to the contents of the updated information. Accordingly, the labor and time required in the user terminals 5 to 7 can be further reduced, and the contents of the desirable updated information can be obtained quickly. Since the limited agent 1 intervenes in the Internet, useless traffic on the Internet does not increase, and resources relating to the push service process can be reduced. Further, the expandability of the push service process can be heightened.

A fourth embodiment of the present invention will be explained below. In the first to third embodiments, the agent 1 which is connected directly with the Internet N executes the process instead of the user terminals 5 to 7. However, in this fourth embodiment, a plurality of agents are provided in the sub-net connected to the Internet N, and the plurality of agents execute the push service process efficiently.

Figure 9:
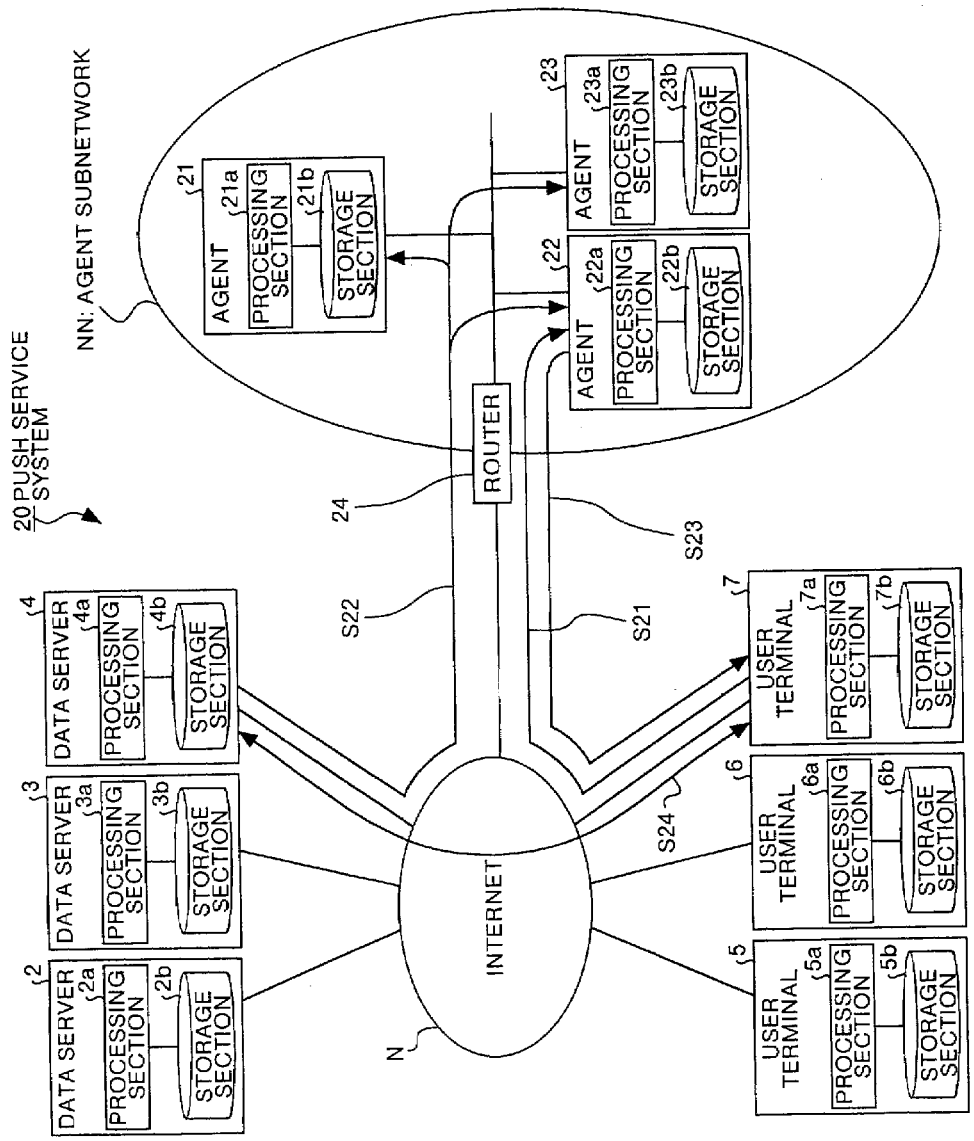
FIG. 9 is a diagram showing the structure of the push service system according to a fourth embodiment of the present invention.

FIG. 9 is a diagram showing the structure of the push service system according to the fourth embodiment of the present invention. As shown in FIG. 9, in a push service system 20, a plurality of data servers 2 to 4 and a plurality of user terminals 5 to 7 are connected to the Internet N, and an agent subnetwork NN such as LAN is connected to the Internet N via router 24. A plurality of agents 21 to 23 in the agent subnetwork NN are connected to the Internet N via the router 24. The user terminals 5 to 7 register information such as addresses of the user terminals 5 to 7 and information such as data types to be required respectively into one of the agents 21 to 23 (S21).

The agents 21 to 23 serve as substitute for the registered user terminals 5 to 7. In the case where various information which is held and managed by the data servers 2 to 4 is updated, the data servers 2 to 4 broadcast the information about updating to the agents 21 to 23 via the router 24 (S22). In the case where the information about updating is posted from the data servers 2 to 4, the agents 21 to 23 make comparison and analysis as to whether or not the information about updating is information which is requested by the user terminals 5 to 7. When they coincide with each other, the agents 21 to 23 post the information about updating to the user terminals 5 to 7 (S23).

When the user terminals 5 to 7 receive the information about updating, the user terminals 5 to 7 directly access to the data servers 2 to 4, which have posted the information about updating, via the Internet N, and obtain contents of the updated information (S24). As a result, a series of the push service process is executed. The agents 21 to 23 have processing sections 21a to 23a and storage sections 21b and 23b respectively. The data servers 2 to 4 have processing sections 2a to 4a and storage sections 2b to 4b respectively. The user terminals 5 to 7 have processing sections 5a to 7a and storage sections 5b to 7b respectively.

Figure 10:
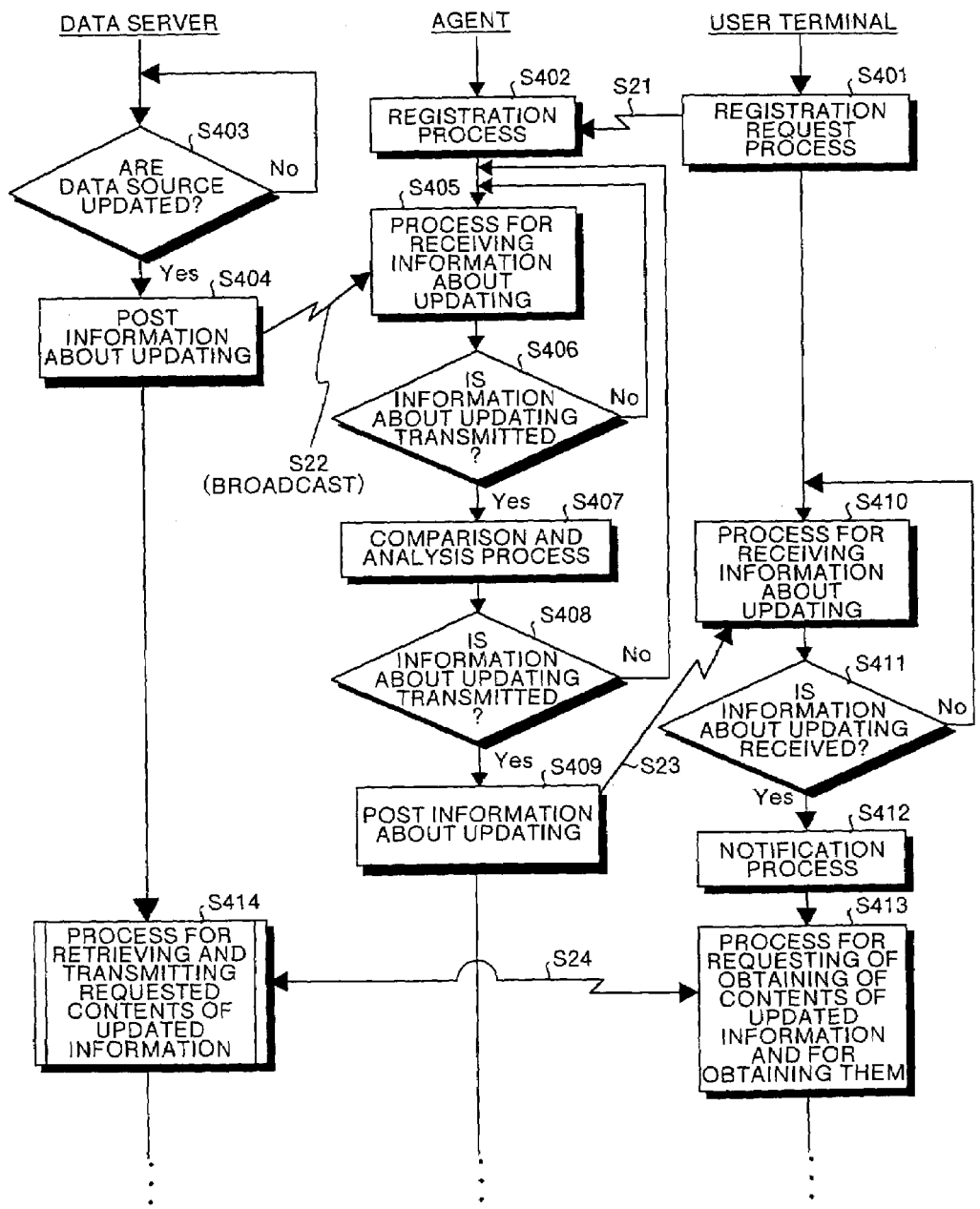
FIG. 10 is a flow chart showing the push service processing procedure according to the fourth embodiment of the present invention.

A series of the push service process according to the fourth embodiment will be explained below with reference to the flow chart shown in FIG. 10. FIG. 10 is the flow chart showing the push service processing procedure performed by the push service system according to the fourth embodiment of the present invention. As shown in FIG. 10, the user terminals 5 to 7 execute a registration request process for the agents 21 to 23 (steps S401 and S21). The agents 21 to 23 which have received the request of the registration register the user terminals 5 to 7 which have requested the registration (S402).

Meanwhile, the data servers 2 to 4 judge as to whether or not data sources of various information stored in the storage sections 2b to 4b are updated (step S403). When the data sources are updated (YES at step S403), the data servers 2 to 4 broadcast to post the information about updating to the agents 21 to 23 via the Internet N and the router 24 (steps S404 and S22). The information about updating is information representing updating and is not entity of the updated information.

The agents 21 to 23 execute a process for receiving the information about updating (step S405), and judge as to whether or not the information about updating is received (step S406). Thereafter, the agents 21 to 23 compare and analyze the information about updating with the information held by the agents 21 to 23 (step S407). In the comparison and analysis, the data type represented by the information about updating is compared with the data type registered by the user terminal so that a determination is made as to whether or not the data types coincide with each other or corresponding data type exists.

Thereafter, the agents 21 to 23 judge as to whether or not the received information about updating should be transmitted to the registered user terminals (step S408). When the judgment is made that the information about updating should be transmitted to the user terminals (YES at step S408), the agents 21 to 23 posts the information about updating to the user terminals which request and are registered (steps S409 and S23). When the information about updating is not received (NO at step S406) and is not transmitted (NO at step S408), the agents 21 to 23 go to step S405 and repeats the process for receiving the information about updating.

The user terminals 5 to 7 execute a process for receiving the information about updating (step S410), and judge as to whether or not the information about updating is received (step S411). When the information about updating is received (YES at step S411), the user terminals 5 to 7 notify the information about updating (step S412). For example, the information about updating are displayed on display sections, not shown, of the user terminals 5 to 7 or an alarm is sounded.

Thereafter, the user terminals 5 to 7 request the data servers, which hold contents of the updated information as entity of the updated information, as to the obtaining of the contents of the updated information based on the information about updating via the Internet N. The data servers retrieve the requested contents of the updated information and transmit the contents of the updated information to the user terminals which have made the request. The user terminals obtain the contents of the updated information (steps S413, S414 and S24). As a result, a series of the push service process according to the fourth embodiment is executed.

The fourth embodiment explains that the process corresponding to the process in the first embodiment is executed, but the process is not limited to this and the process corresponding to the process in the second or third embodiment may be executed. That is, in the case where the process corresponding to that in the second embodiment is executed, the agents 21 to 23 access to the data servers 2 to 4 based on the information about updating posted by the data servers 2 to 4 so as to obtain the contents of the updated information, and transmit the obtained contents of the updated information to the user terminals 5 to 7. Moreover, in the case where the process corresponding to that in the third embodiment is executed, the data servers 2 to 4 transmit the contents of the updated information to the agents 21 to 23, and the agents 21 to 23 transmit the contents of the updated information to the user terminals 5 to 7.

According to the fourth embodiment, a plurality of the agents 21 to 23 are provided in the agent subnetwork NN, and the plurality of agents 21 to 23 are connected to the Internet N via the router 24. For this reason, if user terminals to be registered in the agents increase, the labor and time required in the user terminals 5 to 7 can be reduced, and the desired contents of the updated information can be obtained quickly. Moreover, since the limited agents intervene in the Internet, useless traffic on the Internet does not increase, and resources relating to the push service process can be reduced. Moreover, the expandability of the push service process can be heightened.

A fifth embodiment of the present invention will be explained below. In the fourth embodiment, the agent subnetwork NN is connected to the Internet N via the router 24. However, in this fifth embodiment, a representative agent 25 is provided between the router 24 and the Internet N, and the agents 21 to 23 in the agent subnetwork NN are connected to the Internet N via the representative agent 25.

Figure 11:
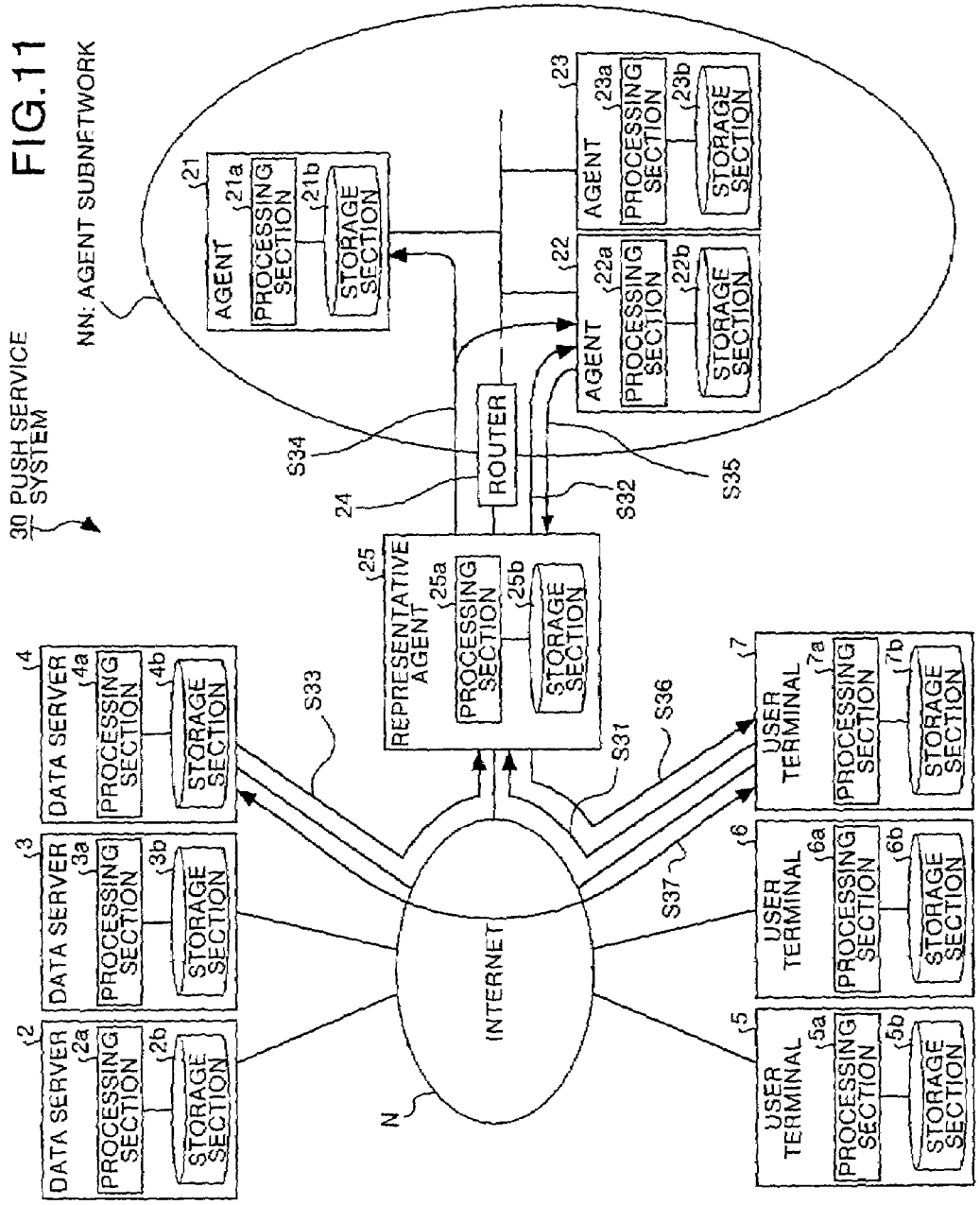
FIG. 11 is a diagram showing the structure of the push service system according to a fifth embodiment of the present invention.

FIG. 11 is a diagram showing the structure of the push service system according to the fifth embodiment of the present invention. As shown in FIG. 11, in the push service system 30, a plurality of data servers 2 to 4 and a plurality of user terminals 5 to 7 and the representative agent 25 are connected to the Internet N. The representative agent 25 is connected to the agent subnetwork NN such as LAN via the router 24, and the plurality of agents 21 to 23 in the agent subnetwork NN are connected to the Internet N via the router 24 and the representative agent 25. That is, the representative agent 25 is provided between the router 24 and the Internet N in the structure according to the fourth embodiment.

The user terminals 5 to 7 transmit information such as addresses of the user terminals 5 to 7 and information such as data types to be requested as registration request to the representative agent 25 (S31). The representative agent 25 transmits the registration request to suitable one of the agents 21 to 23 (S32), and the agents 21 and 23 register the user terminals which have made the registration request. The agents 21 to 23 serve as substitute for the registered user terminals 5 to 7. In the case where various information which is held and managed by the data servers 2 to 4 is updated, the data servers 2 to 4 transmit the information about updating to the representative agent 25 (S33). The representative agent 25 broadcasts the information about updating to the agents 21 to 23 via the router 24 (S34).

When the information about updating is posted, the agents 21 to 23 make comparison and analysis as to whether or not the information about updating is information requested by the user terminals 5 to 7. When both the information coincide with each other, the agents 21 to 23 transmit the information about updating to the representative agent 25 (S35). The representative agent 25 posts the information about updating to the user terminals 5 to 7 (S36). When the user terminals 5 to 7 receive the information about updating, the user terminals 5 to 7 access directly to the data servers 2 to 4 which have posted the information about updating via the Internet N, and obtain contents of the updated information (S37).

When the data servers 2 to 4 and the user terminals 5 to 7 have the addresses of the agents 21 to 23, the data servers 2 to 4 and the user terminals 5 to 7 may access directly to the agents 21 to 23. In this case, the representative agent 25 only execute a transit process as a simple path.

The agents 21 to 23 have processing sections 21a to 23a and storage sections 21b and 23b respectively. The representative agent 25 has a processing section 25a and a storage section 25b. The data servers 2 to 4 have processing sections 2a to 4a and storage sections 2b and 4b respectively. The user terminals 5 to 7 have processing sections 5a to 7a and storage sections 5b to 7b respectively.

Figure 12:
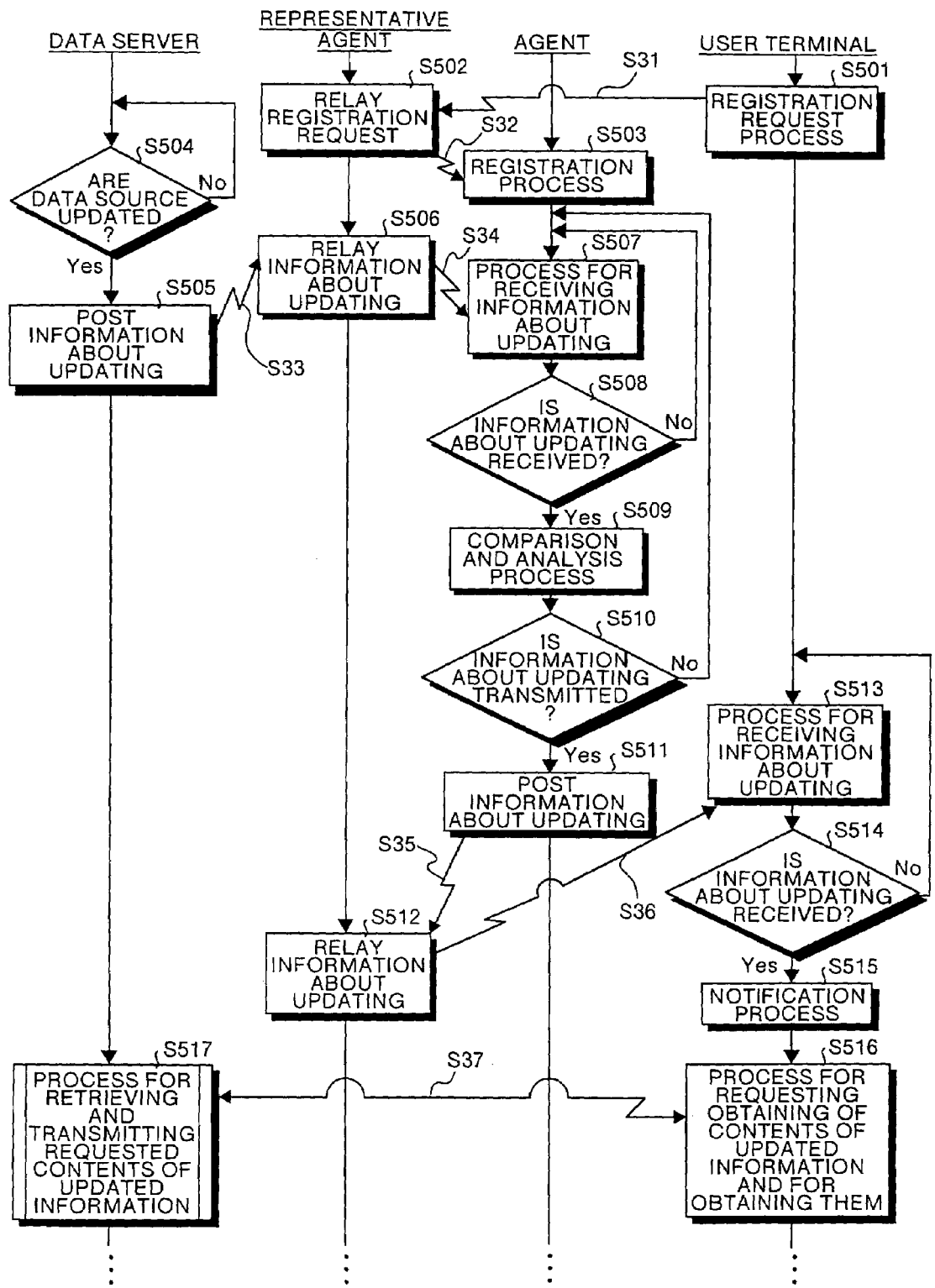
FIG. 12 is a flow chart showing the push service processing procedure according to the fifth embodiment of the present invention.

A series of the push service process according to the fifth embodiment will be explained below with reference to the flow chart shown in FIG. 12. FIG. 12 is the flow chart showing the push service processing procedure performed by the push service system according to the fifth embodiment of the present invention. As shown in FIG. 12, the user terminals 5 to 7 execute a registration request process for the representative agent 25 (steps S501 and S31).

The representative agent 25 selects a suitable agent from the agents 21 to 23 based on the contents of the updated information, and execute a transit process of the registration request for the selected agent 21 to 23 (step S502 and S32). When the agents 21 to 23 which receives the registration request execute the process for registering the user terminals 5 to 7 which have made the registration request (S503).

Meanwhile, the data servers 2 to 4 judge as to whether or not data sources of various information stored in the storage sections 2b to 4b (step S504). When the data sources are updated (YES at step S504), the data servers 2 to 4 post the information about updating to the representative agent 25 via the Internet N (steps S505 and S33). The representative agent 25 which has received the post broadcasts and posts the information about updating to the agents 21 to 23 via the router 24 (steps S506 and S34).

The agents 21 to 23 execute a process for receiving the information about updating (step S507), and judge as to whether or not the information about updating is received (step S508). Thereafter, the agents 21 to 23 compare and analyzes the information about updating with the information held by the agents 21 to 23 (step S509). In this comparison and analysis, the data type represented by the information about updating is compared with the data type registered by the user terminal so that a determination is made as to whether or not the data types coincide with each other or corresponding data type exists.

Thereafter, the agents 21 to 23 judge as to whether or not the information about updating should be transmitted to the registered user terminals (step S510). When the judgment is made that the information about updating should be transmitted to the user terminals (YES at step S510), the agents 21 to 23 transmits the information about updating to the representative agent 25 (steps S511 and S35). The representative agent 25 posts the information about updating to the registered user terminals (steps S512 and S36). When the information about updating is not received (NO at step S508) and is not transmitted (NO at step S510), the agents 21 to 23 go to step S507 and repeat the process for receiving the information about updating.

The user terminals 5 though 7 execute a process for receiving the information about updating (steps S513), and judge as to whether or not the information about updating is received (step S514). When the information about updating is received (YES at step S514), the user terminals 5 to 7 notify the information about updating (step S515). For example, the information about updating is displayed on the display sections, not shown, of the user terminals 5 to 7 or an alarm is sounded.

Thereafter, the user terminals 5 to 7 request the data servers which hold contents of the updated information which is entity of the updated information as to obtaining the contents of the updated information based on the information about updating via the Internet N. The data servers retrieve the requested contents of the updated information, and transmit the contents of the updated information to the user terminals which have made the request. The user terminals obtain the contents of the updated information (steps S516, S517 and S37). As a result, a series of the push service process according to the fifth embodiment is executed.

The fifth embodiment described that the process corresponding to the process in the first embodiment is executed, but the process is not limited to this, and the process corresponding to the process in the second or third embodiment may be executed. That is, in the case where the process corresponding to the process in the second embodiment is executed, the agents 21 to 23 access to the data serves 2 to 4 based on the information about updating posted by the data servers 2 to 4, and obtain the contents of the updated information. The agents 21 to 23 transmit the obtained contents of the updated information to the user terminals 5 to 7. Moreover, in the case where the process corresponding to the process in the third embodiment is executed, the data servers 2 to 4 transmit the contents of the updated information to the agents 21 to 23. The agents 21 to 23 transmit the contents of the updated information to the user terminals 5 to 7.

According to the fifth embodiment, a plurality of agents 21 to 23 which are provided in the agent subnetwork NN are unified by the representative agent 25. For this reason, if user terminals to be registered into the agent increase, the labor and time required in the user terminals 5 to 7, particularly the labor and time required in the registration process can be reduced, and the desired contents of the updated information can be obtained quickly. Moreover, since the representative agent intervenes in the Internet, useless traffic on the Internet does not increase, and resources relating to the push service process can be reduced. Moreover, the expandability of the push service process can be heightened.

A sixth embodiment of the present invention will be explained below. In the fourth and fifth embodiments, a plurality of agents are provided in the subnetwork to be connected to the Internet N, and the push service process is executed efficiently by the plurality of agents. However, in this sixth embodiment, an agent is provided in a provider to be connected to the Internet N, and the push service process is executed via the agent.

Figure 13:
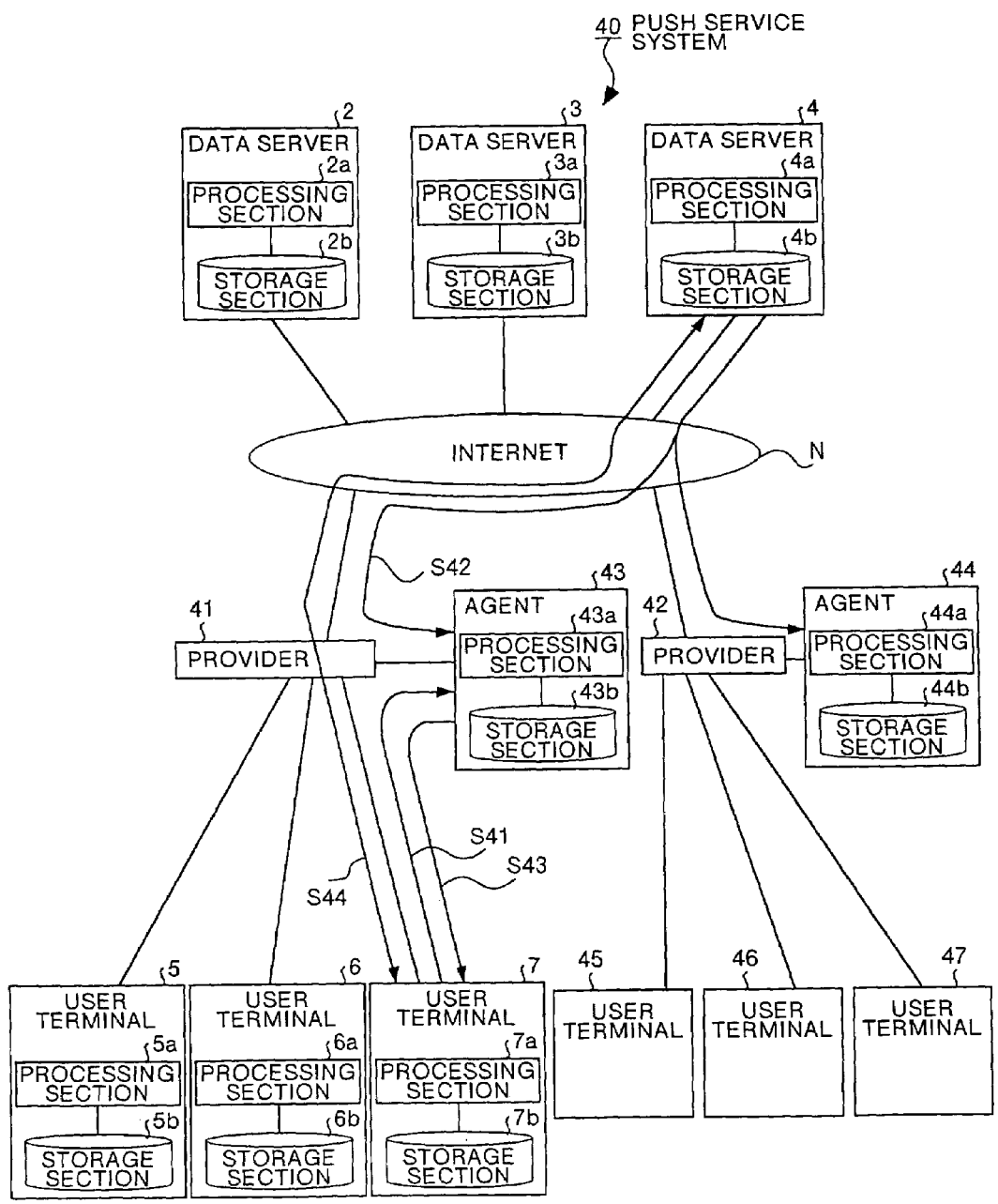
FIG. 13 is a diagram showing the structure of the push service system according to a sixth embodiment of the present invention.

FIG. 13 is a diagram showing the structure of the push service system according to the sixth embodiment of the present invention. As shown in FIG. 13, in the push service system 40, a plurality of data servers 2 to 4 and a plurality of providers 41 and 42 are connected to the Internet N. The providers 41 and 42 locally connect agents 43 and 44 and connect a plurality of user terminals 5 to 7 and 45 to 47.

The user terminals 5 to 7 and 45 to 47 register information such as addresses of the user terminals 5 to 7 and 45 to 47 and information such as data types to be requested into the agents 43 and 44 of the providers 41 and 42 which are connected to the user terminals 5 to 7 and 45 to 47 (S41). The agents 43 and 44 serve as substitute for the registered user terminals 5 to 7 and 45 to 47. When various information which is held and managed by the data servers 2 to 4 is updated, the data servers 2 to 4 transmit information about updating to the providers 41 and 42 having the agents 43 and 44 and post it to the agents 43 and 44 (S42).

When the information about updating is posted from he data servers 2 to 4, the agents 43 and 44 make comparison and analysis as to whether or not the information about updating is information which is requested by the user terminals 5 to 7 and 45 to 47 connected to the providers 41 and 42. When both the information coincide with each other, the agents 43 and 44 post the information about updating to the user terminals 5 to 7 and 45 to 47 (S43). When the user terminals 5 to 7 and 45 to 47 receive the information about updating, the user terminals 5 to 7 and 45 to 47 access directly to the data servers 2 to 4, which have posted the information about updating. via the Internet N so as to obtain contents of the updated information (S44).

As a result, a series of the push service process is executed. The agents 43 and 44 have processing sections 43a and 44a and storage sections 43b and 44b respectively. The data servers 2 to 4 have processing sections 2a to 4a and storage sections 2b to 4b respectively. The user terminals 5 to 7 have processing sections 5a to 7a and storage sections 5b to 7b respectively.

Figure 14:
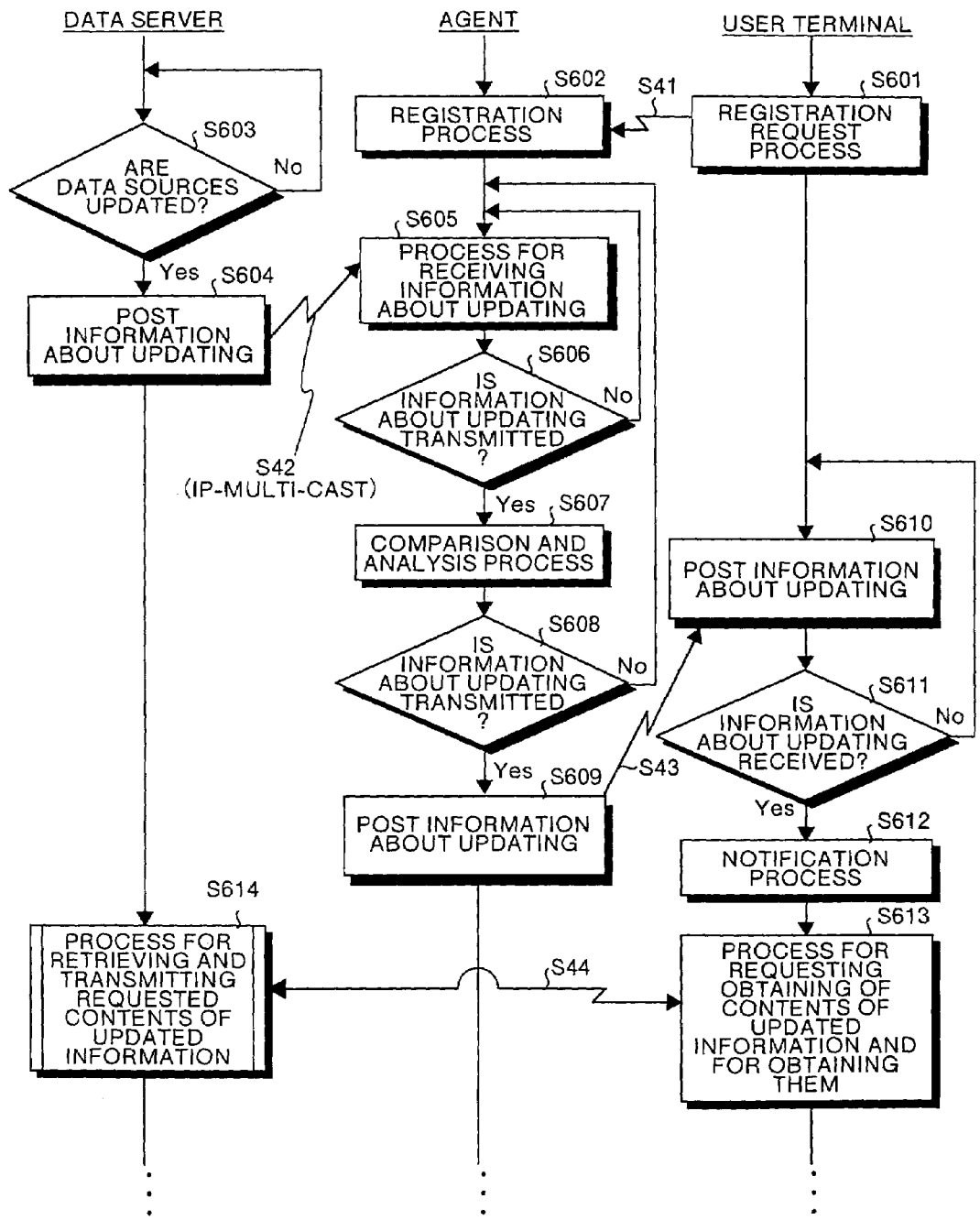
FIG. 14 is a flow chart showing the push service processing procedure according to the sixth embodiment of the present invention.

A series of the push service process according to the sixth embodiment will be explained below with reference to the flow chart in FIG. 14. FIG. 14 is the flow chart showing the push service processing procedure performed by the push service system according to the sixth embodiment of the present invention. As shown in FIG. 14, for example, the user terminals 5 to 7 execute a registration request process for the agent 43 of the provider 41 (steps S601 and S41). On the contrary, the agent 43 execute a process for registering the user terminals 5 to 7 which have made the registration request (S602).

Meanwhile, the data servers 2 to 4 judge as to whether or not the data sources of various information stored in the storage sections 2b to 4b are updated (step S603). When the data sources are updated (YES at step S603), the data servers 2 to 4 IP-multi-cast the information about updating to the provider 41 via the Internet N and post it to the agent 43 (steps S604 and S42).

The agent 43 executes a process for receiving the information about updating (step S605), and judges as to whether or not the information about updating is received (step S606). Thereafter, the agent 43 compares and analyzes the information about updating with the information held by the agent 43 (step S607). In the comparison and analysis, the data type represented by the information about updating is compared with the data type registered by the user terminal so that a determination is made as to whether or not the data types coincide with each other or corresponding data type exists.

Thereafter, the agent 43 judges as to whether or not the received information about updating should be transmitted to the registered user terminals 5 to 7 (step S608). When the judgment is made that the information about updating should be transmitted to the user terminals 5 to 7 (YES at step S608), the agent 43 posts the information about updating to the registered user terminals 5 to 7 (steps S609 and S43). When the information about updating is not received (NO at step S606) and is not transmitted (NO at step S608), the agent 43 goes to step S605 so as to repeat the process for receiving the information about updating.

The user terminals 5 to 7 execute a process for receiving the information about updating (step S610) and judge as to whether or not the information about updating is received (step S611). When the information about updating is received (YES at step S611), the user terminals 5 to 7 notify the information about updating (step S612). For example, the information about updating is displayed on the display sections, not shown, of the user terminals 5 to 7 or an alarm is sounded.

Thereafter, the user terminals 5 to 7 request the data servers which hold contents of the updated information which is entity of the information about updating as to obtaining of the contents of the updated information based on the information about updating via the Internet N. The data servers retrieve the requested contents of the updated information so as to transmit the contents of the updated information to the user terminals which have made the request. The user terminals obtain the contents of the updated information (steps S613, S614 and S44). As a result, a series of the push service process according to the sixth embodiment is executed.

The sixth embodiment described that the process corresponding to the process in the first embodiment is executed, but the process is not limited to this, and the process corresponding to the process in the second or third embodiment may be executed. That is, in the case where the process corresponding to the process in the second embodiment is executed, the agents 43 to 44 access to the data serves 2 to 4 based on the information about updating posted by the data servers 2 to 4, and obtain the contents of the updated information. The agents 43 to 44 transmit the obtained contents of the updated information to the user terminals 5 to 7 and 45 to 47. Moreover, in the case where the process corresponding to the process in the third embodiment is executed, the data servers 2 to 4 transmit the contents of the updated information to the agents 43 to 44. The agents 43 and 44 transmit the contents of the updated information to the user terminals 5 to 7 and 45 to 47.

According to the sixth embodiment, the agents 43 and 44 are provided in the providers 41 and 42 which connect the user terminals 5 to 7 and 45 to 47, and the agents 43 and 44 distributively manage and are substitute for the user terminals 5 to 7 and 45 to 47 connected with the providers 41 and 42. For this reason, the labor and time required in the user terminals 5 to 7 and 45 to 47 can be reduced, and the desired contents of the updated information can be obtained quickly. Moreover, useless traffic on the Internet does not increase, and resources relating to the push service process can be reduced. Moreover, the expandability of the push service process can be heightened.

A seventh embodiment of the present invention will be explained below. In the sixth embodiment, the agents are provided in the provider to be connected to the Internet N, and the push service process is executed via the agents. However, in the seventh embodiment, a hierarchical relationship is given to the agents correspondingly to a hierarchical relationship of the providers so that the push service process is executed.

Figure 15:
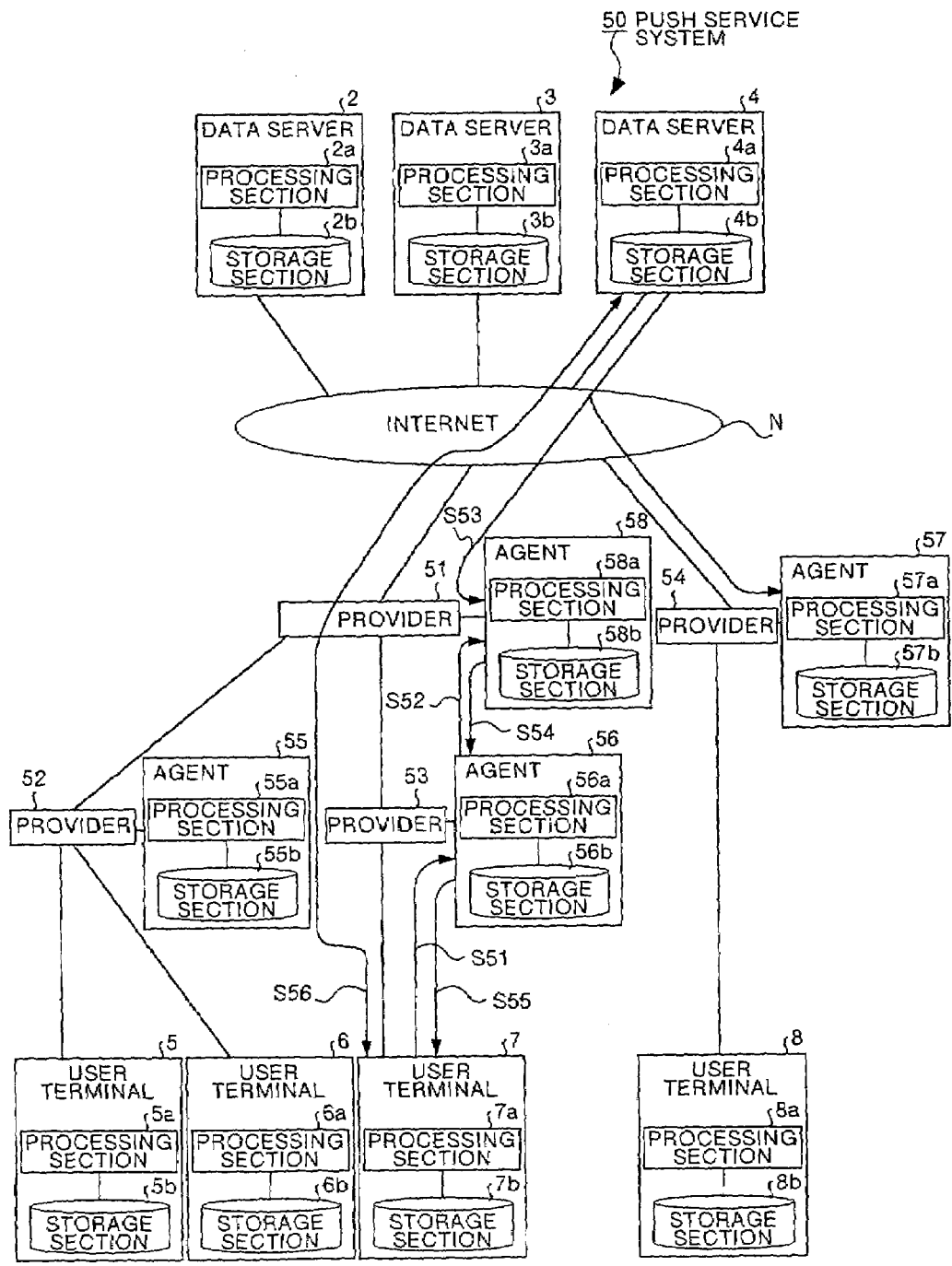
FIG. 15 is a diagram showing the structure of the push service system according to a seventh embodiment of the present invention.

FIG. 15 is a diagram showing the structure of the push service system according to the seventh embodiment of the present invention. As shown in FIG. 15, in the push service system 50, a plurality of data servers 2 to 4 and a plurality of providers 51 to 54 are connected to the Internet N. The providers 51 to 54 locally connect the agents 55 to 58.

Low hierarchical providers 52 and 53 are connected to the provider 51, and agents 55 and 56 are locally connected to the providers 52 and 53 respectively. Moreover, the providers 52, 53 and 54 connect the user terminals 5, 6, 7 and 8. As a result, the agent 55 is substitute for the user terminals 5 and 6, the agent 56 is substitute for the user terminal 7, the agent 58 is substitute for the user terminals 5 to 7, and the agent 57 is substitute for the user terminal 8. Namely, the agent 58 and the agents 55 and 56 have the hierarchical relationship.

As for a summary of a series of the push service process, for example the user terminal 7 registered information such as an address of the user terminal 7 and information such as a data type to be requested into the agent 56 of the provider 53 (S51). The agent 56 serves as the user terminal for the high hierarchical agent 58. The agent 56 registers the user terminal 7 and requests the high-hierarchical agent 58 of the high-hierarchical provider 51 to register the user terminal 7 so as to register (S52). When various information which is held and managed by the data servers 2 to 4 is updated, the server 2 to 4 IP-multi-scan information about updating to the providers 51 and 54 so as to transmit the information about updating to the agents 58 and 57 (S53). When the information about updating is information about updating which is managed by the registered low-hierarchical agent, the agent 58 posts the information about updating to the agent 56 (S54).

Further, when the information about updating is information about updating which is requested by the registered user terminal 7, the agent 56 posts the information about updating to the user terminal 7 (S55). When the user terminal 7 receives the information about updating, the user terminal 7 accesses directly to the data servers 2 to 4 which have posted the information about updating via the Internet N so as to obtain contents of the updated information (S56). As a result, a series of the push service process is executed. The agents 55 to 58 have processing sections 55*a* to 58*a* and storage sections 55*b* to 58*b* respectively. The data servers 2 to 4 have processing sections 2*a* to 4*a* and storage sections 2*b* and 4*b* respectively. The user terminals 5 to 8 have processing sections 5*a* to 8*a* and storage sections 5*b* and 8*b* respectively.

Figure 16:
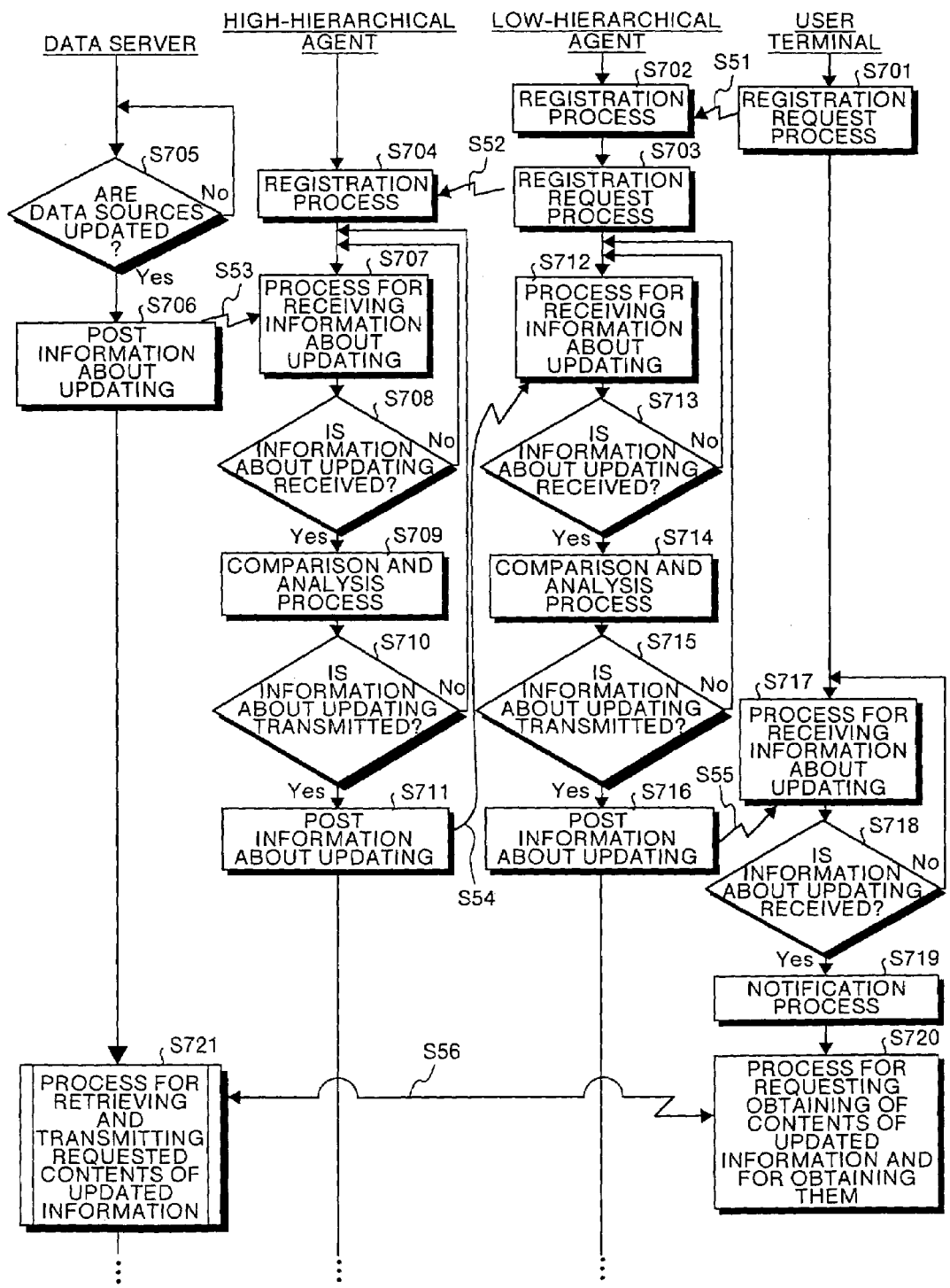
FIG. 16 is a flow chart showing the push service processing procedure according to the seventh embodiment of the present invention.

A series of the push service process according to the seventh embodiment will be explained below with reference to the flow chart shown in FIG. 16. FIG. 16 is the flow chart showing the push service processing procedure performed by the push service system according to the seventh embodiment of the present invention. As shown in FIG. 16, for example user terminals 5 to 7 request the low-hierarchical agents 55 and 56 of the providers 52 and 53 connected to the user terminals 5 to 7 to register the user terminals 5 to 7 (steps S701 and S51). The low-hierarchical agents 55 and 56 which receive the registration request execute the registration process (step S702), and request the high-hierarchical agent 58 to register the registered contents (steps S703 and S52). On the contrary, the high-hierarchical agent 58 registers the low-hierarchical agents 55 and 56 which have been requested as to their registration (step S704).

Meanwhile, the data servers 2 to 4 judge as to whether or not data sources of various information stored in the storage sections 2*b* to 4*b* are updated (step S705). When the data sources are updated (YES at step S705), the data servers 2 to 4 IP-multi-cast information about updating to the providers 51 and 57 via the Internet N and post the information about updating to the agents 58 and 57 (steps S706 and S53).

The high-hierarchical agent 58 executes a process for receiving the information about updating (step S707), and judges as to whether or not the information about updating is received (step S708). Thereafter, the high-hierarchical agent 58 compares and analyzes the information about updating with information held by the agent 58 (step S709). In this comparison and analysis, the data type represented by the information about updating is compared with the data type registered by the user terminal so that a determination is made as to whether or not the data types coincide with each other or corresponding data type exists.

Thereafter, the high-hierarchical agent 58 judges as to whether or not the received information about updating should be transmitted to the low-hierarchical agents 55 and 56 (step S710). When the judgment is made that the information about updating should be transmitted to the low-hierarchical agents 55 and 56 (YES step S710), the agent 58 posts the information about updating to the registered low-hierarchical agents 55 and 56 which have made the request (steps S711 and S54). When the information about updating is not received (NO at step S708) and is not transmitted (NO at step S710), the agent 58 goes to step S707 so as to repeat the process for receiving the information about updating.

The low-hierarchical agents 55 and 56 execute a process for receiving the information about updating from the high-hierarchical agent 58 (step S712), and judge as to whether or not the information about updating is received (step S713). Thereafter, the agents 55 and 56 compare and analyze the information about updating with information held by the agents 55 and 56 (step S714). Thereafter, the agents 55 and 56 judge as to whether or not the received information about updating should be transmitted tot he user terminals 5 and 6 and the user terminal 7 connected to the agents 55 and 56 respectively (step S715). When the judgment is made that the information about updating should be transmitted to the user terminals 5 to 7 (YES at step S715), the agents 55 and 56 post the information about updating to the registered user terminals 5 to 7 which have made the request (steps S716 and S55). When the information about updating is not received (NO at step S713) and is not transmitted (NO at step S715), the agents 55 and 56 go to step S712 so as to repeat the process for receiving the information about updating.

The user terminals 5 to 7 execute a process for receiving the information about updating (step S717), and judge as to whether or not the information about updating is received (step S718). When the information about updating is received (YES at step S718), the user terminals 5 to 7 notify the information about updating (step S719). For example, the information about updating is displayed on the display sections, not shown, of the user terminal 5 to 7 or an alarm is sounded.

Thereafter, the user terminals 5 to 7 request the data servers which hold contents of the updated information which is entity of the updated information as to obtaining of the contents of the updated information via the Internet N based on the information about updating. The data servers retrieve the requested contents of the updated information and transmit the contents of the updated information to the user terminals which have made the request. The user terminals obtain the contents of the updated information (steps S720, S721 and S56). As a result, a series of the push service process according to the seventh embodiment is executed.

The seventh embodiment described that the process corresponding to the process in the first embodiment is executed, but the process is not limited to this, and the process corresponding to the process in the second or third embodiment may be executed. That is, in the case where the process corresponding to the process in the second embodiment is executed, the agent 51 or the agents 55 to 56 access to the data serves 2 to 4 based on the information about updating posted by the data servers 2 to 4, and obtain the contents of the updated information. The obtained contents of the updated information is transmitted to the user terminals 5 to 7 directly or via the agents 55 and 56. Moreover, in the case where the process corresponding to the process in the third embodiment is executed, the data servers 2 to 4 transmit the contents of the updated information to the agent 51. The agent 51 transmits the contents of the updated information to the agents 55 and 56, and the agents 55 and 56 transmit the contents of the updated information to the user terminals 5 to 7.

When the data type which is managed by the high-hierarchical agent 51 is updated, the agent 51 automatically posts the updated data type to the low-hierarchical agents 55 and 56.

According to the seventh embodiment, the agent 51 is the high-hierarchical agent and the agents 55 and 56 are the low-hierarchical agents, namely, a plurality of agents are provided so as to have the hierarchical relationship. Accordingly, the labor and time required in the user terminals 5 to 7 and 45 to 47 can be reduced, and the desired contents of the updated information can be obtained quickly. Moreover, useless traffic on the Internet does not increase, and resources relating to the push service process can be reduced. Moreover, the expandability of the push service process can be heightened.

Eighth embodiment of the present invention will be explained below. In the first to seventh embodiments, the agent transmits the information about updating and the contents of the updated information to the user terminals via the Internet N. In this eighth embodiment an agent utilizes a network different from the Internet N and transmits information about updating and contents of updated information to user terminals.

Figure 17:
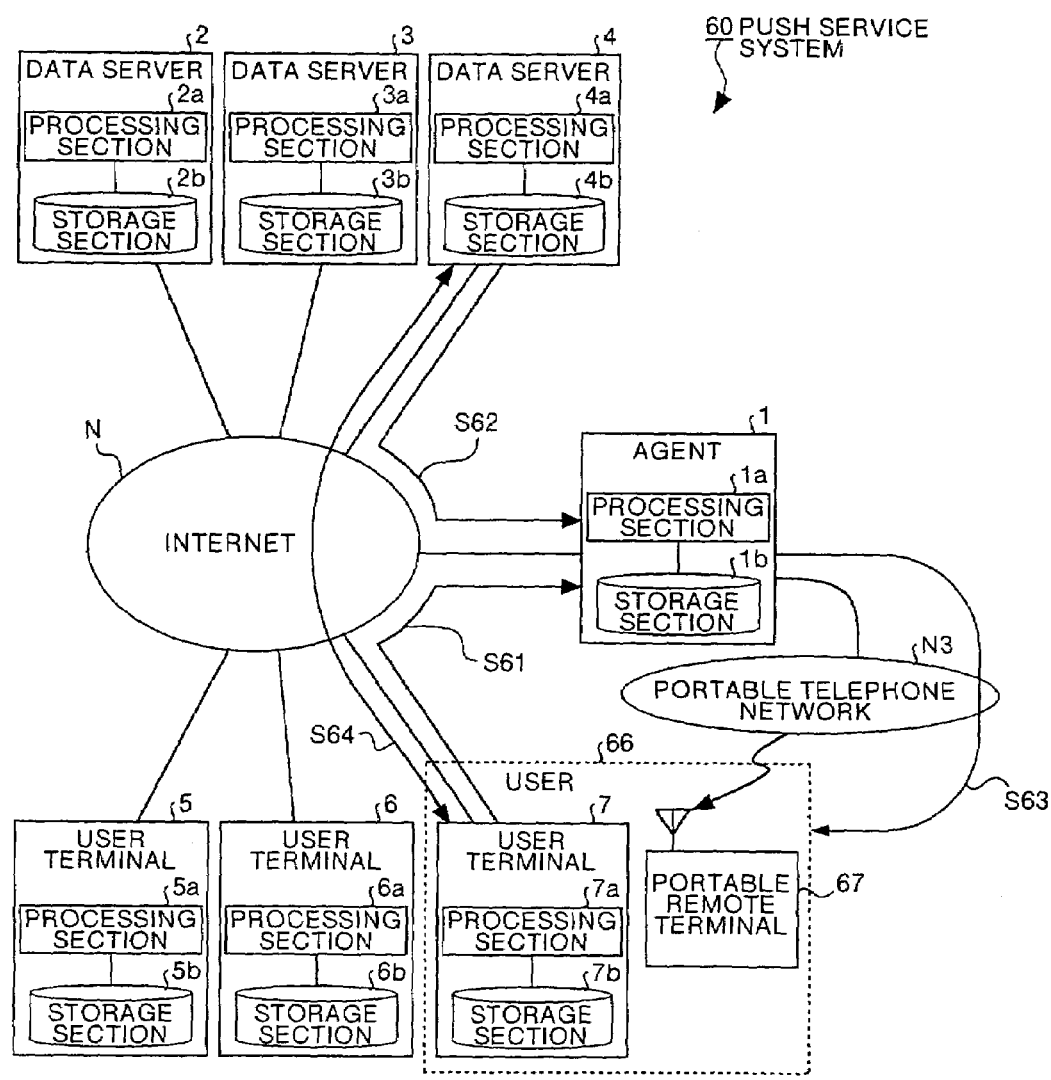
FIG. 17 is a diagram showing the structure of the push service system according to an eighth embodiment of the present invention.

FIG. 17 is a diagram showing the structure of the push service system according to the eighth embodiment of the present invention. As shown in FIG. 17, in the push service system 60, similarly to the structure in the first embodiment shown in FIG. 1, the agent 1, a plurality of data servers 2 to 4 and a plurality of user terminals 5 to 7 are connected to the Internet N. Further, a portable remote terminal 67 which is recognized as a user 66 of the user terminal 7 is provided, and a portable telephone network N3 which is a network different from the Internet N intervenes between the agent 1 and the portable remote terminal 67.

As for a summary of a series of the push service process in the eighth embodiment, the user terminals 5 to 7 register information such as addresses of the user terminals 5 to 7 and information of data types to be requested into the agent 1 (S61). When various information which is held and managed by the data servers 2 to 4 is updated, the data servers 2 to 4 transmits information about updating to the agent 1 (S62). When the information about updating is information relating to updating managed by the registered user terminal 7, the agent 1 posts it to the portable remote terminal 67 via the portable telephone network N3 (S63).

When the portable remote terminal 67 receives the information about updating, the portable remote terminal 67 and the user 66 of the user terminal 7 access directly to the data servers 2 to 4 which have posted the information about updating via the Internet N using the user terminal 7, and obtain contents of the updated information (S64). As a result, a series of the push service process is executed. The agent 1 has a processing section 1a and a storage section 1b. The data servers 2 to 4 have processing sections 2a to 4a and storage sections 2b to 4b respectively. The user terminals 5 to 7 have processing sections 5a to 7a and storage sections 5b to 7b respectively.

Figure 18:
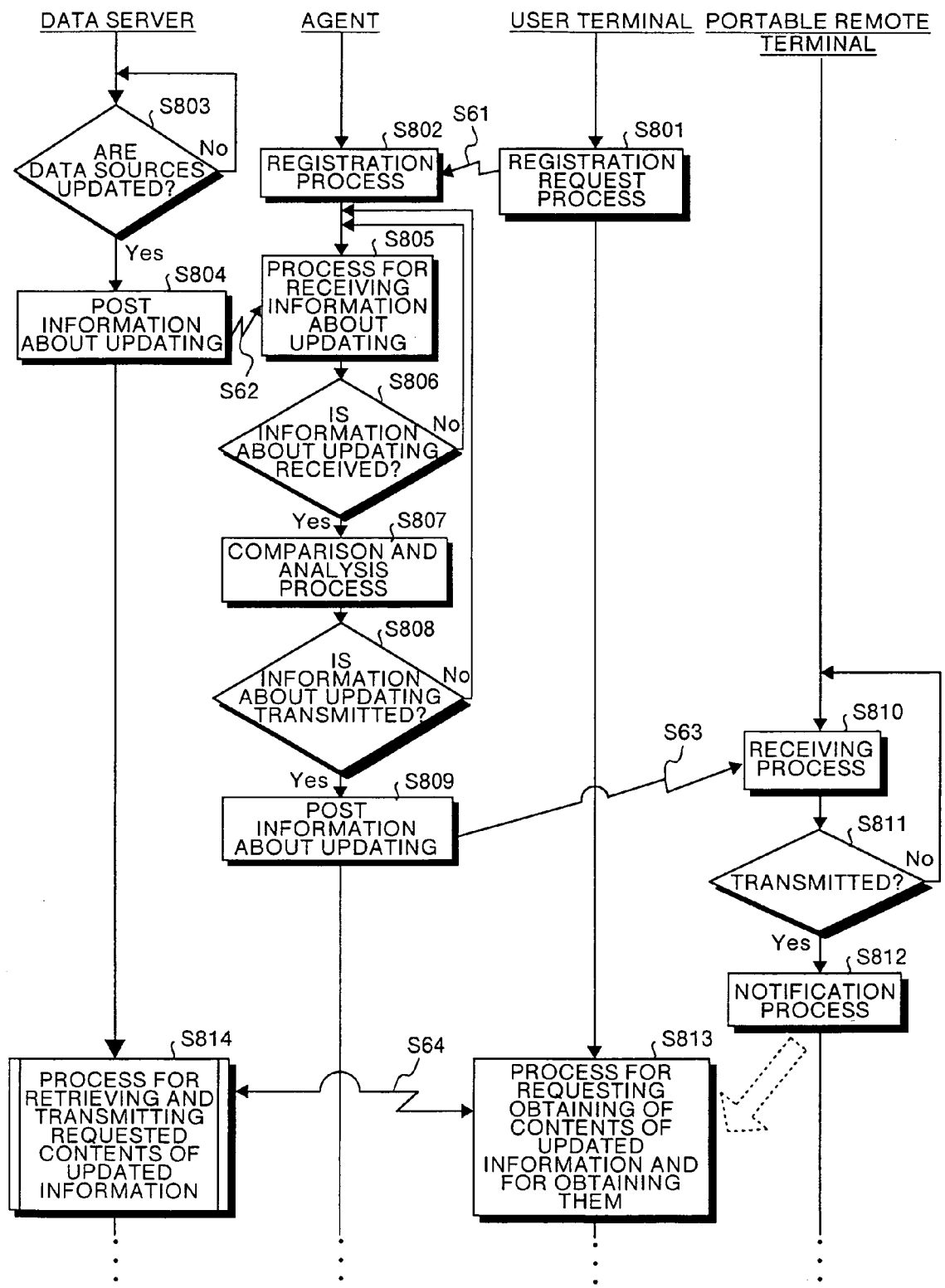
FIG. 18 is a flow chart showing the push service processing procedure according to the eighth embodiment of the present invention.

A series of the push service process according to the eighth embodiment will be explained below with reference to the flow chart shown in FIG. 18. FIG. 18 is the flow chart showing the push service processing procedure performed by the push service system according to the eighth embodiment of the present invention. As shown in FIG. 18, the user terminals 5 to 7 execute a registration process for the agent 1 (steps S801 and S61). On the contrary, the agent 1 executes a registration process for the user terminals 5 to 7 which have made the registration request (S802).

Meanwhile, the data servers 2 to 4 judge as to whether or not data sources of various information stored in the storage sections 2b to 4b are updated (step S803). When the data sources are updated (YES at step S803), the data servers 2 to 4 post information about updating to the agent 1 via the Internet N (steps S804 and S62). The information about updating is information representing updating and is not entity of the updated information.

The agent 1 executes a process for receiving the information about updating (step S805), and judges as to whether or not the information about updating is received (step S806). Thereafter, the agent 1 compares and analyzes the information about updating with information held by the agent 1 (step S807). In this comparison and analysis, the data type represented by the information about updating is compared with the data type registered by the user terminal so that a determination is made as to whether or not the data types coincide with each other or corresponding data type exists. Thereafter, the agent 1 judges as to whether or not the received information about updating should be transmitted to the registered user terminals (step S808).

When the judgment is made that the information about updating should be transmitted to the user terminals (YES at step S808), the agent 1 posts the information about updating to the portable remote terminal 67 which is recognized as the user of the registered user terminal 7 which has made the request via the portable telephone network N3 (steps S809 and S63). In the case where the information about updating can be posted to the portable remote terminal 67 via the portable telephone network N3, when the user terminal 7 is registered as another terminal information D16 shown in FIG. 4A into the agent 1, it is necessary to register information such as type and telephone number of the portable remote terminal. When the information about updating is not received (NO at step S806) and is not transmitted (NO at step S808), the agent 1 goes to step S805 so as to repeat the process for receiving the information about updating.

The portable remote terminal 67 executes a process for receiving the information about updating (step S810), and judges as to whether or not the information about updating is received (step S811). When the information about updating is received (YES at step S811), the portable remote terminal 67 notify the information about updating (step S812). For example, the information about updating is displayed on a display section, not shown, of the portable remote terminal 67, or an alarm or a vibration is generated. Thereafter, the user terminal 7 of the user 66, which receive the notification requests the data servers which hold contents of the updated information which is entity of the updated information, as to obtaining the contents of updated information via the Internet N based on the information about updating. The data servers retrieve the requested contents of the updated information and transmit the contents of the updated information to the user terminal which has made the request. The user terminal obtains the contents of the updated information (steps S813, S814 and S64).

When the information about updating is posted to the portable remote terminal 67 via the portable telephone network N3, the agent 1 does not post the information about updating but may simply post the updating or post a telephone number with which the agent 1 can be recognized. As a result, the user 66 can know that the information desired by the user 66 is changed, and when the user 66 inquires at the agent 1 or the information is less data type, the user 66 may access to the data servers directly.

FIG. 17 shows the structure that the portable remote terminal 67 is separated from the user terminal 7, but the structure is not limited to this, and the portable remote terminal 67 may be connected to the user terminal 7. In this case, the information about updating is posted to the user terminal 7 via the portable telephone network N3 which is a network other than the Internet N.

Further, the portable telephone network N3 is shown as one example of a network other than the Internet N, but the network is not limited to this, another one may be used.

The eighth embodiment described that the process corresponding to the process in the first embodiment is executed, but the process is not limited to this, and the process corresponding to the process in the second or third embodiment may be executed. That is, in the case where the process corresponding to the process in the second embodiment is executed, the agent 1 accesses to the data serves 2 to 4 based on the information about updating posted by the data servers 2 to 4, and obtain the contents of the updated information. The agent 1 transmits the obtained contents of the updated information to the portable remote terminal 67 or the user terminal 7 via the portable telephone network N3. Moreover, in the case where the process corresponding to the process in the third embodiment is executed, the data servers 2 to 4 transmit the contents of the updated information to the agent 1. The agent 1 transmits the contents of the updated information to the portable remote terminal 67 and the user terminal 7 via the portable telephone network N3.

According to the eighth embodiment, the agent 1 posts the information about updating or the contents of the updated information to the user terminal via the portable telephone network N3 which is a network other than the Internet N. Accordingly, the labor and time required in the user terminals 5 to 7 can be reduced, and the desired contents of the updated information can be obtained quickly. Moreover, useless traffic on the Internet does not increase, and resources relating to the push service process can be reduced. Moreover, the expandability of the push service process can be heightened.

As explained above, according to one aspect of this invention, a plurality of user terminals transmit information of the user terminals and requested various information to some of not less than one agents so as to execute the registration process. A plurality of data servers have various information and post information about updating of various information to the agents. When the posted information about updating is the information about updating which is requested by the registered user terminals, the not less than one agents post the information about updating to the registered user terminals. The user terminals which have received the post access directly to the data servers which hold contents of the updated information via the network based on the posted information about updating, and obtain the contents of the updated information. For this reason, the labor and time which are required for the user terminals can be reduced, and the desired updated information contents can be obtained quickly. Moreover, since the limited agents intervene in the network, useless traffic on the network does not increase, and resources to be required for the push service process can be reduced. Further, the expandability of the push service can be heightened.

According to another aspect of this invention, a plurality of user terminals transmit information of the user terminals and requested various information to some of not less than one agents so as to execute the registration process. A plurality of data servers have various information and post information about updating of various information to the agents. When the posted information about updating is the information about updating which is requested by the registered user terminals, the not less than one agents access to the data servers which have posted the information about updating via the network, and obtain contents of the updated information, and post the contents of the updated information to the registered user terminals via the network. The user terminals which have received the post receive the posted contents of the updated information, and obtain the contents of the updated information. For this reason, the labor and time which are required for the user terminals can be reduced, and the desired updated information contents can be obtained quickly. Moreover, since the limited agents intervene in the network, useless traffic on the network does not increase, and resources to be required for the push service process can be reduced. Further, the expandability of the push service can be heightened.

According to still another aspect of this invention, a plurality of user terminals transmit information of the user terminals and requested various information to some of not less than one agents so as to execute the registration process. A plurality of data servers have various information and post information about updating of various information to the agents. When posted contents of the updated information is the information about updating which is requested by the registered user terminals, the not less than one agents post the contents of the updated information to the registered user terminals via the network. The user terminals which have received the post receive the posted contents of the updated information and obtain it. For this reason, the labor and time which are required for the user terminals can be reduced, and the desired updated information contents can be obtained quickly. Moreover, since the limited agents intervene in the network, useless traffic on the network does not increase, and resources to be required for the push service process can be reduced. Further, the expandability of the push service can be heightened.

Further, a plurality of user terminals transmit information of the user terminals and requested various information to some of the plurality of agents in the subnetwork connected to the network so as to execute the registration process. A plurality of data servers have various information and post information about updating of various information or contents of the updated information to the agents by means of broadcasting. When the posted information about updating or contents of the updated information is the information about updating which is requested by the registered user terminals, the agents post the information about updating or contents of the updated information to the registered user terminals via the network. The user terminals which have received the post access to the data servers which hold the contents of the updated information based on the posted information about updating and obtain the contents of the updated information, or receive the posted contents of the updated information so as to obtain them. For this reason, the labor and time which are required for the user terminals can be further reduced, and the desired updated information contents can be obtained quickly. Moreover, since the limited agents intervene in the network, useless traffic on the network does not increase, and resources to be required for the push service process can be reduced. Further, the expandability of the push service can be heightened.

Further, a plurality of user terminals transmit information of the user terminals and requested various information to representative agent connected to the network. The representative agent transmit the information about user terminals and the request various information suitably to some of the plurality of agents in the subnetwork so as to execute the registration process. A plurality of data servers have various information and post information about updating of various information or contents of the updated information to the representative agent. The representative agent posts them to the agent by means of broadcasting. When the posted information about updating or contents of the updated information is the information about updating which is requested by the registered user terminals, the agents post the information about updating or contents of the updated information to the registered user terminals via the representative agent or the network. The user terminals which have received the post access to the data servers which hold the contents of the updated information based on the posted information about updating and obtain the contents of the updated information, or receive the posted contents of the updated information so as to obtain them. For this reason, the labor and time which are required for the user terminals can be further reduced, and the desired updated information contents can be obtained quickly. Moreover, since the limited agents intervene in the network, useless traffic on the network does not increase, and resources to be required for the push service process can be reduced. Particularly since the representative agent can execute the registration process for the agents flexibly, the expandability of the push service can be heightened.

Further, a plurality of user terminals transmit information of the user terminals and requested various information to agents which are locally connected to providers connecting the user terminals so as to execute the registration process. A plurality of data servers have various information, and IP-multi-cast and post information about updating of various information or contents of the updated information to the agents via the provider. When the posted information about updating or contents of the updated information is the information about updating which is requested by the registered user terminals, the agents post the information about updating or contents of the updated information to the registered user terminals. The user terminals which have received the post access to the data servers which hold the contents of the updated information based on the posted information about updating and obtain the contents of the updated information, or receive the posted contents of the updated information so as to obtain them. For this reason, the labor and time which are required for the user terminals can be further reduced, and the desired updated information contents can be obtained quickly. Moreover, since the limited agents intervene in the network, useless traffic on the network does not increase, and resources to be required for the push service process can be reduced. Particularly since the representative agent can execute the registration process for the agents flexibly, the expandability of the push service can be heightened.

Further, a plurality of user terminals transmit information of the user terminals and requested various information to a high-hierarchical agent which is locally connected to the provider connecting the user so as to execute the registration process. The high-hierarchical agent transmits the information of the registered user terminals and requested various information to a higher-hierarchical agent so as to execute a registration process. A plurality of data servers have various information, and IP-multi-cast and post information about updating of various information or contents of the updated information to the highest-hierarchical agents via the provider. When the posted information about updating or contents of the updated information is the information about updating which is requested by the registered user terminals, the highest-hierarchical agents post the information about updating to the registered user terminals or the contents of the updated information to the low-hierarchical agents. When the posted information about updating and contents of the updated information is information about updating requested by the registered user terminals, the low-hierarchical agents which have received the post the information about updating to the registered user terminals or contents of the updated information to the low-hierarchical agents or the user terminals. When the low-hierarchical agents have lower-hierarchical agents, the posting process which is similar to the low-hierarchical agents is executed. The user terminals access to the data servers which hold the contents of the updated information based on the posted information about updating and obtain the contents of the updated information, or receive the posted contents of the updated information so as to obtain them. For this reason, the labor and time which are required for the user terminals can be further reduced, and the desired updated information contents can be obtained quickly. Moreover, since the limited agents intervene in the network, useless traffic on the network does not increase, and resources to be required for the push service process can be reduced. Particularly since the representative agent can execute the registration process for the agents flexibly, the expandability of the push service can be heightened.

Further, a plurality of user terminals transmit information of the user terminals and requested various information to some of not less than one agents so as to execute the registration process. A plurality of data servers have various information and post information about updating of various information to the agents. When the posted information about updating is the information about updating which is requested by the registered user terminals, the not less than one agents post the information about updating to the registered user terminals via a network different from the above-mentioned network, such as a portable telephone network. The user terminals which have received the post access directly to the data servers which hold contents of the updated information via the network based on the posted information about updating, and obtain the contents of the updated information. For this reason, the labor and time which are required for the user terminals can be reduced, and the desired updated information contents can be obtained quickly regardless of locations of the users. Moreover, since the limited agents intervene in the network, useless traffic on the network does not increase, and resources to be required for the push service process can be reduced. Further, the expandability of the push service can be heightened.

Further, when not less than one agents accept the post that various information is provided from a data server which is not registered in a list table of data servers which provide various information, the agents automatically register the unregistered data server into the list table. For this reason, the scope of the push service process can be automatically expanded.

Further, when not less than one agents accept the post of management contents of various information managed by data servers which provide the various information, the agents automatically add or delete data servers in data type management information based on the posted management contents. For this reason, the scope of the push service process to be executed by the not less than one agents is automatically optimized.

Further, not less than one agents accept the post of information about adding or deleting data types of various information managed by data servers which provide the various information, the agents add or delete data servers which relate to the data types to be added or deleted to/from the data servers in data type management information. For this reason, the scope of the push service process to be executed by the not less than one agents is automatically optimized.

Further, when data types to be managed are changed, not less than one agents post the change of the data types to registered user terminals. For this reason, the scope of the push service process to be executed by the not less than one agents is automatically optimized, and the user terminals can immediately recognize the change of the data types which change dynamically and can be obtained.

Further, data types are managed in a hierarchical relationship and when the data types are changed, not less than one agents post the change of the data types to user terminals in which data types with lower hierarchy than that of the changed data types. For this reason, the scope of the push service process to be executed by the not less than one agents is automatically optimized, and even if the data types are managed in the hierarchical relationship, the user terminals can immediately recognize the change of the data types which change dynamically and can be obtained.

According to still another aspect of this invention, information of the user terminals connected to a network using an Internet protocol and various information which is requested to be posted by the user terminals are registered into agents, which are connected to the network and are substitute for the user terminals, at a registration step. A plurality of data servers which are connected to the network and hold various information post information about updating of the various information to the agents via the network at a first post step. When the agents accept the information about updating posted by the data servers and the information about updating is information about updating requested by the registered user terminals, the agents post the information about updating to the registered user terminals via the network at a second post step. The user terminals accept the post of the information about updating from the agents at a obtaining step. The user terminals accept to the data servers which have posted the information about updating at the first post step via the network so as to obtain contents of the updated information. For this reason, the labor and time which are required for the user terminals can be reduced, and the desired updated information contents can be obtained quickly. Moreover, since the limited agents intervene in the network, useless traffic on the network does not increase, and resources to be required for the push service process can be reduced. Further, the expandability of the push service can be heightened.

According to still another aspect of this invention, information of the user terminals connected to a network using an Internet protocol and various information which is requested to be posted by the user terminals are registered into agents, which are connected to the network and are substitute for the user terminals, at a registration step. A plurality of data servers which are connected to the network and hold various information post information about updating of the various information to the agents via the network at a first post step. When the agents accept the information about updating posted by the data servers and the information about updating is information about updating requested by the registered user terminals, the agents access to the data servers which have posted the information about updating via the network so as to obtain contents of the updated information at an obtaining step. The agents post the contents of the updated information obtained at the obtaining step to the registered user terminals via the network at a second post step. For this reason, the labor and time which are required for the user terminals can be reduced, and the desired updated information contents can be obtained quickly. Moreover, since the limited agents intervene in the network, useless traffic on the network does not increase, and resources to be required for the push service process can be reduced. Further, the expandability of the push service can be heightened.

According to still another aspect of this invention, information of the user terminals connected to a network using an Internet protocol and various information which is requested to be posted by the user terminals are registered into agents, which are connected to the network and are substitute for the user terminals, at a registration step. A plurality of data servers which are connected to the network and hold various information post contents of the updated various information to the agents via the network at a first post step. When the agents accept the information about updating of the various information posted by the data servers and the information about updating is information about updating requested by the registered user terminals, the agents post the contents of the updated information to the registered user terminals via the network at a second post step. For this reason, the labor and time which are required for the user terminals can be reduced, and the desired updated information contents can be obtained quickly. Moreover, since the limited agents intervene in the network, useless traffic on the network does not increase, and resources to be required for the push service process can be reduced. Further, the expandability of the push service can be heightened.

Further, agents post information about updating or contents of updated information, which are posted by data servers via a network other than the above network, such as a portable telephone network to user terminals. For this reason, the labor and time which are required for the user terminals can be reduced, and the desired updated information contents can be obtained quickly regardless of locations of users.

Further, when not less than one agents accept the post that various information is provided from a data server which is unregistered in a list table for managing a list of data servers for providing the various information, the agents automatically register the data server into the list table. For this reason, the scope of the push service process can be automatically expanded.

Further, when not less than one agents accept the post of management contents of various information managed by data servers which provide the various information, the agents automatically add or delete data servers in data type management information managed per data type based on the posted management contents. For this reason, the scope of the push service process to be executed by the not less than one agents is automatically optimized.

Further, not less than one agents accept the post of information about adding or deleting data types of various information managed by data servers which provide the various information, the agents automatically add or delete data servers which relate to the data types to be added or deleted to/from the data servers in data type management information for managing the various information per data type. For this reason, the scope of the push service process to be executed by the not less than one agents is automatically optimized.

Further, when data types to be managed are changed, not less than one agents automatically post the change of the data types to the user terminals. For this reason, the scope of the push service process to be executed by the not less than one agents is automatically optimized, and the user terminals can immediately recognize the changing of the data types which change dynamically and can be obtained.

Further, data types are managed in a hierarchical relationship and when the data types are changed, not less than one agents post the change of the data types to user terminals in which data types with lower hierarchy than that of the changed data types. For this reason, the scope of the push service process to be executed by the not less than one agents is automatically optimized, and even if the data types are managed in the hierarchical relationship, the user terminals can immediately recognize the change of the data types which change dynamically and can be obtained.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. A content push service system for push-distribution of content to subscribers to the service where a plurality of content servers, at least one agent unit, and a plurality of user terminals of the subscribers are connected to a network using an Internet protocol, where each of the content servers is configured to store respective content and to push-transmit update information related to updating of its content to the at least one agent serving as a substitute for the user terminals connected via the network, the push-transmit being responsive to the content having been updated in the content server, the system comprising:

the at least one agent unit, which is configured to receive the update information and to transmit via the network the update information to one or more of the user terminals if the update information relates to content that has been registered in the at least one agent unit as being requested by the users of the one or more of the user terminals; and where the one or more of the user terminals are configured to receive the update information transmitted from the at least one agent unit and to obtain the content updated the at least one agent is locally connected to at least one provider connected to the network, the user terminals are connected to the at least one provider, and the content servers transmit the update information or the content updated to the at least one agent via the at least one provider, and the at least one agent transmits at least one of the update information and the content updated to the user terminals via the at least one provider, the at least one provider comprises a plurality of providers having a hierarchical relationship among each other, and each including the at least one agent unit, the user terminals and a lower agent unit of the agent units that is directly connected to a lower provider in a hierarchy lower than a hierarchy of an upper provider of the providers register information about the user terminals and about which information is requested into an upper agent unit connected directly to the upper provider, and the upper agent unit transmits, to the lower agent unit connected to lower user terminals of the user terminals, the lower user terminals that have requested at least one of the update information and the content updated, the update information updated transmitted from the content servers.

2. A content push service system for push-distribution of content to subscribers to the service where a plurality of content servers, at least one agent unit, and a plurality of user terminals of the subscribers are connected to a network using an Internet protocol, where each of the content servers is configured to store respective content and to push-transmit update information related to updating of its content to the at least one agent serving as a substitute for the user terminals connected via the network, the push-transmit being responsive to the content having been updated in the content server, the system comprising:

the at least one agent unit, which is configured to receive the update information and to transmit via the network the update information to one or more of the user terminals if the update information relates to content that has been registered in the at least one agent unit as being requested by the users of the one or more of the user terminals; and where the one or more of the user terminals are configured to receive the update information transmitted from the at least one agent unit and to obtain the content updated, wherein the at least one agent unit has a table listing content servers that provide content, and when the at least one agent unit is notified by a content server not registered in the table that the content is going to be provided from the content server the at least one agent registers the content server into the table.

3. A content push service system for push-distribution of content to subscribers to the service where a plurality of content servers, at least one agent unit, and a plurality of user terminals of the subscribers are connected to a network using an Internet protocol, where each of the content servers is configured to store respective content and to push-transmit update information related to updating of its content to the at least one agent serving as a substitute for the user terminals connected via the network, the push-transmit being responsive to the content having been updated in the content server, the system comprising:

the at least one agent unit, which is configured to receive the update information and to transmit via the network the update information to one or more of the user terminals if the update information relates to content that has been registered in the at least one agent unit as being requested by the users of the one or more of the user terminals; and where the one or more of the user terminals are configured to receive the update information transmitted from the at least one agent unit and to obtain the content updated, wherein the at least one agent unit further has content type management information for managing the information per content type, and when the at least one agent unit receives a notification made by one of the content servers about what kind of management is carried out on the content managed by the one of the content servers, the at least one agent unit adds or deletes the one of the content servers from the content type management information based on the notification.

4. The content push service system according to claim 3, wherein when the at least one agent unit receives a notification made by one of the content servers about addition or deletion of content of a content type of the content managed by the one of the content servers, the at least one agent unit adds or deletes the content server/servers related to the content type to or from the content type management information.

5. The content push service system according to claim 3, wherein when the information of the content type of the information managed by the at least one agent unit is changed the at least one agent unit notifies the user terminals of the change.

6. The content push service system according to claim 5, wherein the at least one agent unit manages the content types such that the content types have a hierarchical relationship among each other, and when information of one of the content types is changed the at least one agent unit notifies of the change to a user terminal of the user terminals which has been registered to receive a lower content type having a hierarchy lower than a hierarchy of the one of the content types changed.

7. A push service processing method for use with push-distribution of content to subscribers to the content rush service, comprising:

registering information about a user terminal of a subscriber connected to a network using an Internet protocol and content requested by the user terminal into an agent which is connected to the network and serves as a substitute for the user terminal;

push-transmitting, from a content server which is connected to the network and stores content, update information related to updating of the content server's content responsive to detection of the content having been updated in the content server, to the agent via the network;

transmitting from the agent the update information to the user terminal via the network if the update information has been requested as indicated by the registering of information about the user terminal; and receiving at the user terminal the update information transmitted from the agent and obtaining at the user terminal the content updated via the network, wherein the agent unit has a table listing content servers that provide content, and when the agent unit is notified by a content server not registered in the table that the content is going to be provided from the content server the agent unit registers the content server into the table.

8. A push service processing method for use with push-distribution of content to subscribers to the content push service, comprising:

registering information about a user terminal of a subscriber connected to a network using an Internet protocol and content requested by the user terminal into an agent which is connected to the network and serves as a substitute for the user terminal;

push-transmitting, from a content server which is connected to the network and stores content, update information related to updating of the content server's content responsive to detection of the content having been updated in the content server, to the agent via the network;

transmitting from the agent the update information to the user terminal via the network if the update information has been requested as indicated by the registering of information about the user terminal; and receiving at the user terminal the update information transmitted from the agent and obtaining at the user terminal the content updated via the network, wherein the agent unit further has content type management information for managing the content per content type, and when the agent unit receives a notification made by the content server about what kind of management is carried out on the content managed by the content server, the agent unit adds or deletes the content server from the content type management information based on the notification.

9. A push service processing method for use with push-distribution of content to subscribers to the content push service, comprising:

registering information about a user terminal of a subscriber connected to a network using an Internet protocol and content requested by the user terminal into an agent which is connected to the network and serves as a substitute for the user terminal;

push-transmitting, from a content server which is connected to the network and stores content, update information related to updating of the content server's content responsive to detection of the content having been undated in the content server, to the agent via the network;

transmitting from the agent the update information to the user terminal via the network if the update information has been requested as indicated by the registering of information about the user terminal; and receiving at the user terminal the update information transmitted from the agent and obtaining at the user terminal the content updated via the network, wherein when the agent unit receives a notification made by the content server about addition or deletion of content of a content type of the information managed by the content server, the agent unit adds or deletes the content server or content servers related to the content type to or from the content type management information.

* * * * *

UNITED STATES PATENT AND TRADEMARK OFFICE
CERTIFICATE OF CORRECTION

PATENT NO.         : 6,999,991 B1
APPLICATION NO. : 09/624337
DATED                 : February 14, 2006
INVENTOR(S)       : Hiroshi Ikeda It is certified that error appears in the above-identified patent and that said Letters Patent is hereby corrected as shown below:

Column 32, claim 7, line 2, change "rush" to --push--

Column 33, claim 9, line 5, change "undated" to --updated--

Signed and Sealed this

Twenty-ninth Day of August, 2006

JON W. DUDAS
*Director of the United States Patent and Trademark Office*